(12) United States Patent
Shin et al.

(10) Patent No.: US 12,468,344 B2
(45) Date of Patent: Nov. 11, 2025

(54) DISPLAY APPARATUS

(71) Applicant: Samsung Display Co., Ltd., Yongin-Si (KR)

(72) Inventors: Dongchul Shin, Yongin-si (KR); Hyelan Kim, Yongin-si (KR); Jangyeol Yoon, Yongin-si (KR); Jiwon Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 202 days.

(21) Appl. No.: 18/098,743

(22) Filed: Jan. 19, 2023

(65) Prior Publication Data

US 2023/0273642 A1    Aug. 31, 2023

(30) Foreign Application Priority Data

Jan. 27, 2022    (KR) .......................... 10-2022-0012582

(51) Int. Cl.
*G06F 1/16*     (2006.01)
*H10K 50/844*   (2023.01)
*H10K 59/121*   (2023.01)

(52) U.S. Cl.
CPC ....... *G06F 1/1652* (2013.01); *H10K 50/8445* (2023.02); *H10K 59/1213* (2023.02)

(58) Field of Classification Search
CPC ............................ G06F 1/1652; H10K 9/1213
See application file for complete search history.

(56) References Cited

U.S. PATENT DOCUMENTS

| | | | |
|---|---|---|---|
| 9,450,125 B2 | 9/2016 | Lee | |
| 10,541,380 B1 | 1/2020 | Sung et al. | |
| 10,916,595 B2 | 2/2021 | Park et al. | |
| 11,275,408 B2 | 3/2022 | Ahn et al. | |
| 11,557,636 B2 | 1/2023 | Byun et al. | |
| 2020/0303677 A1* | 9/2020 | Lee | H10K 50/844 |
| 2020/0388783 A1* | 12/2020 | Kang | G02F 1/133385 |
| 2020/0403171 A1* | 12/2020 | Park | H10K 77/111 |
| 2021/0202686 A1* | 7/2021 | Jeon | G09F 9/302 |

(Continued)

FOREIGN PATENT DOCUMENTS

| | | |
|---|---|---|
| CN | 111370454 A | 7/2020 |
| CN | 111427476 A | 7/2020 |

(Continued)

*Primary Examiner* — Imani N Hayman
*Assistant Examiner* — Rashen E Morrison
(74) *Attorney, Agent, or Firm* — Innovation Counsel LLP

(57) ABSTRACT

A display apparatus includes a display panel in which a penetrating opening portion is defined, the display panel including a first display portion in which a first pixel is arranged, a second display portion in which a second pixel is arranged, a connection portion extending in a first direction to connect the first display portion to the second display portion and including, at a central portion thereof, a crack inducing pattern extending in a second direction intersecting the first direction, and a encapsulation layer disposed on the first display portion, the second display portion, and the connection portion, wherein the crack inducing pattern includes a first groove at a central portion of the crack inducing pattern and a first pattern layer disposed on the first groove and including a first tip protruding toward a center of the first groove.

28 Claims, 15 Drawing Sheets

(56) References Cited

U.S. PATENT DOCUMENTS

2022/0140063 A1    5/2022  Park et al.
2022/0199920 A1*   6/2022  Kim .................... H10K 50/844

FOREIGN PATENT DOCUMENTS

| KR | 10-1973163 B1    | 4/2019 |
| KR | 1020200005706 A  | 1/2020 |
| KR | 1020200026381 A  | 3/2020 |
| KR | 10-2020-0078176 A | 7/2020 |
| KR | 1020210028790 A  | 3/2021 |

* cited by examiner

DISPLAY APPARATUS

CROSS-REFERENCE TO RELATED APPLICATION

This application is based on and claims priority under 35 U.S.C. § 119 to Korean Patent Application No. 10-2022-0012582, filed on Jan. 27, 2022, in the Korean Intellectual Property Office, the disclosure of which is incorporated by reference herein in its entirety.

BACKGROUND

1. Field

One or more embodiments relate to a display apparatus, and more particularly, to a display apparatus having improved flexibility.

2. Description of the Related Art

Portable electronic devices are widely used. As mobile electronic devices, in addition to small electronic devices, such as mobile phones, tablet personal computers (PC) have been widely used in recent years.

Such a mobile electronic device includes a display apparatus that provides various functions, for example, providing visual information, such as an image or a video, to a user. Recently, as the size of other components for driving a display apparatus is reduced, the proportion of the display apparatus in an electronic device has gradually been increasing.

Flexible display apparatuses that are bendable, foldable, or rollable have been recently researched and developed. In addition, research and development on a stretchable display apparatus that can be changed into various shapes has been actively conducted.

SUMMARY

One or more embodiments include a display apparatus having improved flexibility.

Additional aspects will be set forth in part in the description which follows and, in part, will be apparent from the description, or may be learned by practice of the presented embodiments of the disclosure.

According to one or more embodiments, a display apparatus includes a display panel in which a penetrating opening portion is defined, the display panel including a first display portion in which a first pixel is arranged, a second display portion in which a second pixel is arranged, a connection portion extending in a first direction to connect the first display portion to the second display portion and including, at a central portion thereof, a crack inducing pattern extending in a second direction intersecting the first direction, and a encapsulation layer disposed on the first display portion, the second display portion, and the connection portion, wherein the crack inducing pattern includes a first groove at a central portion of the crack inducing pattern, and a first pattern layer disposed on the first groove and including a first tip protruding toward a center of the first groove.

In the present embodiment, the encapsulation layer may cover the first tip and an inner side surface of the first groove, and have a seam structure in an undercut portion extending from a bottom surface of the first tip to the first groove.

The seam structure of the first inorganic encapsulation layer may include a portion that has a reduced thickness.

In the present embodiment, the connection portion may further include a first etch control layer disposed under the first groove.

In the present embodiment, the first etch control layer may be exposed through a bottom of the first groove.

In the present embodiment, the first etch control layer may include an inorganic material or a metal.

In the present embodiment, the display apparatus may further include a first pixel circuit portion and a second pixel circuit portion, each of the first pixel circuit portion and the second pixel circuit portion may include a thin-film transistor including a semiconductor layer, a gate electrode overlapping the semiconductor layer, and an electrode layer connected to the semiconductor layer, and a connection metal connected to the electrode layer on the electrode layer, and the connection metal may include the same material as that of the first etch control layer.

In the present embodiment, the first tip may include an inorganic material.

In the present embodiment, the display apparatus may further include a second groove surrounding the first pixel and the second pixel and disposed at a perimeter of each of the first display portion and the second display portion.

In the present embodiment, the second groove may have a closed loop shape.

In the present embodiment, the display apparatus may further include a second tip disposed on the second groove and protruding toward a center of the second groove.

In the present embodiment, the second tip may be arranged adjacent to each of the first display portion and the second display portion.

In the present embodiment, the display apparatus may further include a second etch control layer disposed under the second groove and at least partially exposed through the second groove.

In the present embodiment, the display apparatus may further include a second inorganic encapsulation layer on the first inorganic encapsulation layer, and an organic encapsulation layer disposed between the first inorganic encapsulation layer and the second inorganic encapsulation layer, and the organic encapsulation layer may be disposed in the second groove.

In the present embodiment, the organic encapsulation layer may be patterned to correspond to each of the first display portion and the second display portion to independently encapsulate each of the first display portion and the second display portion.

In the present embodiment, the first pixel may include a first light-emitting element and a first pixel circuit portion electrically connected to the first light-emitting element, the second pixel may include a second light-emitting element and a second pixel circuit portion electrically connected to the second light-emitting element, each of the first pixel circuit portion and the second pixel circuit portion may include a plurality of conductive layers and at least one inorganic insulating layer disposed between the plurality of conductive layers, and the at least one inorganic insulating layer may be patterned to an island shape to correspond to each of the first display portion and the second display portion.

In the present embodiment, the at least one inorganic insulating layer may be removed to correspond to the connection portion.

In the present embodiment, the connection portion may further include an organic material layer in an area in which the at least one inorganic insulating layer is removed.

In the present embodiment, the connection portion may further include a line extending to connect the first pixel circuit portion to the second pixel circuit portion, and the line may be disposed on the organic material layer.

In the present embodiment, each of the first pixel circuit portion and the second pixel circuit portion may include a thin-film transistor including a semiconductor layer, a gate electrode overlapping the semiconductor layer, and an electrode layer connected to the semiconductor layer, and the line may include the same material as that of the electrode layer.

In the present embodiment, the display panel may further include a planarization layer configured to cover the first pixel circuit portion and the second pixel circuit portion, and a passivation layer disposed on the planarization layer, each of the first light-emitting element and the second light-emitting element may include a pixel electrode, an opposite electrode disposed on the pixel electrode, and an intermediate layer disposed between the pixel electrode and the opposite electrode, and the passivation layer may be between the planarization layer and the pixel electrode.

In the present embodiment, the first tip may be arranged on the same layer as that of the passivation layer.

The first groove may be provided by etching a portion of the planarization layer.

In the present embodiment, the passivation layer may be removed to correspond to the connection portion.

The display apparatus may further include a second inorganic encapsulation layer directly disposed on the first inorganic encapsulation layer.

The crack inducing pattern may include a plurality of first grooves, and width of the plurality of first grooves adjacent to each other may be different from each other.

According to one or more embodiments, a display apparatus includes a substrate comprising a first display area, a second display area, and a connection area connecting the first display area to the second display area and having a cut portion formed through the substrate, a first display portion arranged in the first display area and comprising a first pixel, a second display portion arranged in the second display area and comprising a second pixel, a crack inducing pattern comprising a groove and a protruding tip on the groove in the connection area, and an encapsulation layer disposed over the first display area, the second display area, and the connection area to cover the crack inducing pattern.

In the present embodiment, the connection area may extend in a first direction, and the crack inducing pattern extends in a second direction intersecting the first direction.

The cut portion may be formed through the substrate.

Other aspects, features, and advantages other than those described above will now become apparent from the following drawings, claims, and the detailed description of the disclosure.

These general and specific aspects may be embodied using a system, a method, a computer program, or a combination of any system, method, and computer program.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
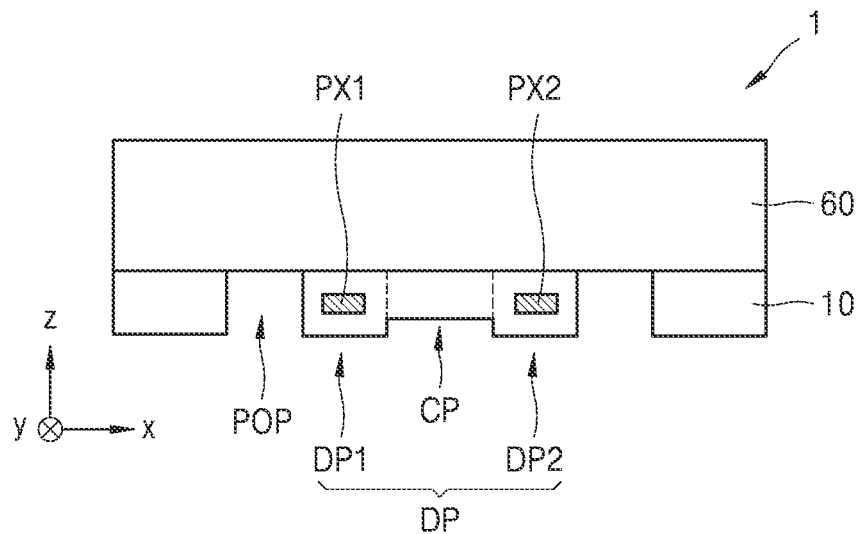
FIG. 1 is a schematic cross-sectional view of a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the present disclosure allows for various changes and numerous embodiments, particular embodiments will be illustrated in the drawings and described in detail in the written description. Effects and features of the present disclosure and methods of achieving the same will be apparent with reference to embodiments and drawings described below in detail. The present disclosure may, however, be embodied in many different forms and should not be construed as being limited to the exemplary embodiments set forth herein.

The disclosure will now be described more fully with reference to the accompanying drawings, in which embodiments of the disclosure are shown. Like reference numerals in the drawings denote like elements, and thus their description will be omitted.

In the present disclosure, while such terms as "first," "second," etc., may be used to describe various elements, such elements must not be limited to the above terms.

In the present disclosure, an expression used in the singular encompasses the expression of the plural, unless it has a clearly different meaning in the context.

In the present disclosure, it is to be understood that the terms such as "including" and "having" are intended to indicate the existence of the features, or elements disclosed in the present disclosure, and are not intended to preclude the possibility that one or more other features or elements may exist or may be added.

In the present disclosure, it will be understood that when a layer, region, or component is referred to as being formed on another layer, region, or component, it can be directly or indirectly formed on the other layer, region, or component. That is, for example, intervening layers, regions, or components may be present.

In the present disclosure, it will be understood that when a layer, region, or component is referred to as being connected to another layer, region, or component, it can be directly or indirectly connected to the other layer, region, or component. That is, for example, intervening layers, regions, or components may be present. For example, it will be understood that when a layer, region, or component is referred to as being electrically connected to another layer, region, or component, it can be directly or indirectly electrically connected to the other layer, region, or component. That is, for example, intervening layers, regions, or components may be present.

In the disclosure, "A and/or B" may include "A," "B," or "A and B." In addition, "at least one of A and B" may include "A," "B," or "A and B."

In the present disclosure, the x, y, and z rows are not limited to three rows on the orthogonal coordinates system, and may be interpreted in a broad sense including the same. For example, the x-axis, the y-axis, and the z-axis may be perpendicular to one another, or may represent different directions that are not perpendicular to one another.

In the present disclosure, when a certain embodiment may be implemented differently, a specific process order may be performed differently from the described order. For example, two consecutively described processes may be performed substantially at the same time or performed in an order opposite to the described order.

Sizes of components in the drawings may be exaggerated for convenience of explanation. In other words, since sizes and thicknesses of components in the drawings are arbitrarily illustrated for convenience of explanation, the following embodiments are not limited thereto.

A display apparatus is an apparatus that displays a video or a still image. The display apparatus may be a portable electronic device, such as a mobile phone, a smartphone, a table personal computer (PC), a mobile communication terminal, an electronic notebook, an electronic book, a portable multimedia player (PMP), a navigation device, an Ultra Mobile PC (UMPC), or the like, and may also be used as a display screen of various products, such as a television, a laptop computer, a monitor, an advertisement board, the Internet of things (IoT), or the like. In addition, the display apparatus according to an embodiment may be used as a wearable device, such as a smart watch, a watch phone, a glasses-type display, and a head-mounted display (HMD). In addition, the display apparatus according to an embodiment may be used as a dashboard of a vehicle, a center fascia of a vehicle or a center information display (CID) disposed on a dashboard, a room mirror display replacing a side mirror of a vehicle, and a display arranged on a back surface of a front seat as entertainment for a back seat of a vehicle.

Figure 2:
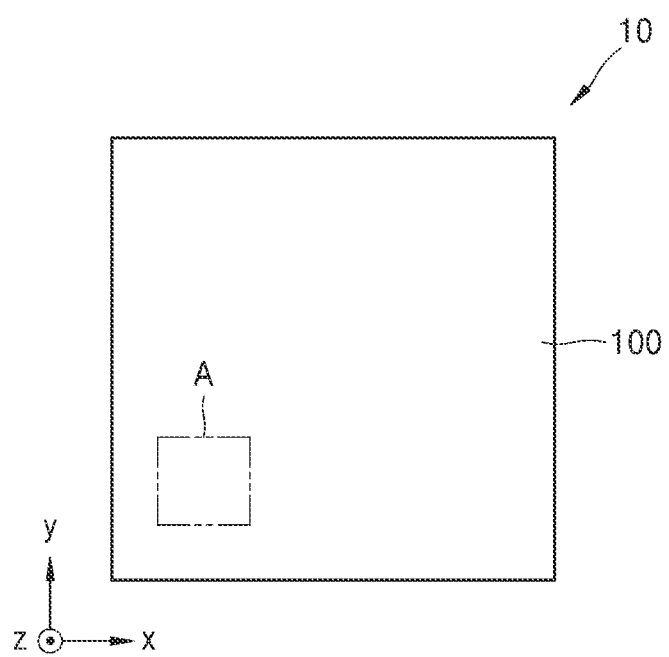
FIG. 2 is a schematic plan view of a display panel according to an embodiment.

FIG. 1 is a schematic cross-sectional view of a display apparatus 1 according to an embodiment, and FIG. 2 is a schematic plan view of a display apparatus 1 according to an embodiment.

Referring to FIG. 1, the display apparatus 1 may include a display panel 10 and a cover window 60. The cover window 60 may be disposed on the display panel 10.

The display panel 10 may display an image. The display panel 10 may include a plurality of pixels, for example, a first pixel PX1 and a second pixel PX2. The display panel 10 may display an image by using the plurality of pixels.

Each of the plurality of pixels may include a display element. The display panel 10 may be an organic light-emitting display panel using an organic light-emitting diode including an organic emission layer. Alternatively, the display panel 10 may be a light-emitting diode (LED) display panel using an LED. The size of an LED may be in a micro scale or a nano scale, for example, the LED may be a micro light-emitting diode. Alternatively, the LED may be a nanorod LED. The nanorod LED may include gallium nitride (GaN). In an embodiment, a color converting layer may be disposed above the nanorod LED. The color converting layer may include quantum dots. Alternatively, the display panel 10 may be a quantum dot light-emitting display panel using a quantum dot light-emitting diode including a quantum dot emission layer. Alternatively, the display panel 10 may be an inorganic light-emitting display panel using an inorganic light-emitting device including an inorganic semiconductor. Hereinafter, a case in which the display panel 10 is an organic light-emitting display panel using an organic light-emitting diode as a display element is mainly described in detail.

The display panel 10 may include a first display portion DP1, a second display portion DP2, and a connection portion CP. The first pixel PX1 may be arranged in the first display portion DP1 and the second pixel PX2 may be arranged in the second display portion DP2. The connection portion CP may be arranged between the first display portion DP1 and the second display portion DP2 to connect the first display portion DP1 to the second display portion DP2. Pixels may not be arranged in the connection portion CP.

A penetrating opening portion POP (that is, a cut portion) may be defined in the display panel 10. The penetrating opening portion POP may penetrate the display panel 10. The penetrating opening portion POP may be an area in which components of the display panel 10 are not arranged. The display panel 10 may have a plurality of penetrating opening portions POP. Accordingly, the display panel 10 may stretch and/or contract.

The cover window 60 may protect the display panel 10. In an embodiment, the cover window 60 may be easily bent by an external force without generating a crack or the like to protect the display panel 10. The cover window 60 may be attached to the display panel 10 by a transparent adhesive member such as an optically clear adhesive (OCA) film.

The cover window 60 may include glass, sapphire, or plastic. The cover window 60 may be, for example, ultra-thin glass (UTG) or a colorless polyimide (CPI). In an embodiment, the cover window 60 may have a structure in which a flexible polymer layer is arranged on one surface of a glass substrate, or may only include a polymer layer.

Referring to FIG. 2, the display panel 10 may include a substrate 100 and a multi-layered film disposed on the substrate 100. The substrate 100 may comprise a first display area in which the first display portion DP1 (refer to FIG. 1) may be arranged, a second display area in which the second display portion DP2 (refer to FIG. 1) may be arranged, and a connection area connecting the first display area to the second display area. In an embodiment, the display panel 10 may include the penetrating opening portion POP (refer to FIG. 1). The substrate 100 may have a cut portion corresponding to the penetrating opening portion POP and adjacent to the first display area, the second display area, and the connection area. The substrate 100 and the multi-layered film may not be arranged in the penetrating opening portion POP. That is, the penetrating opening portion POP may be an empty area of the display panel 10. A plurality of penetrating opening portions POP may be included in the display panel 10. Because the plurality of penetrating opening portions POP are included in the display panel 10, the flexibility of the display apparatus 1 (refer to FIG. 1) including the display panel 10 may be improved.

The substrate 100 may be glass or include a polymer resin such as polyethersulfone, polyarylate, polyetherimide, polyethylene naphthalate, polyethylene terephthalate, polyphenylene sulfide, polyimide, polycarbonate, cellulose triacetate, cellulose acetate propionate, or the like. The substrate 100 including the polymer resin may be flexible, rollable, or bendable. The substrate 100 may have a multi-layered structure including a base layer including the polymer resin stated above and a barrier layer disposed on the polymer resin.

Figure 3:
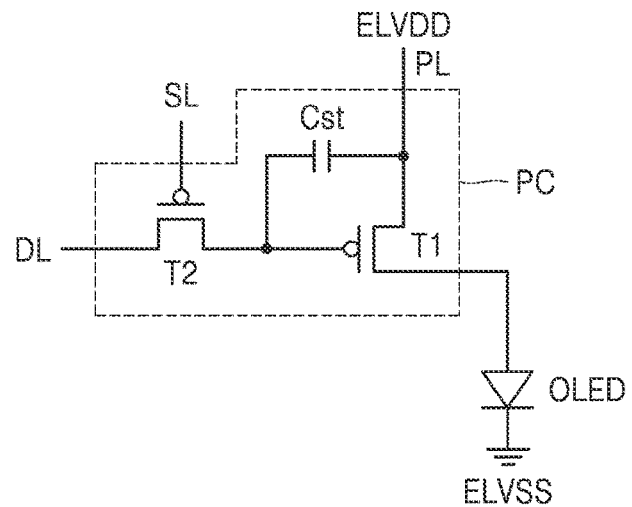
FIG. 3 is an equivalent circuit diagram schematically illustrating a pixel circuit applicable to a display apparatus according to an embodiment.

FIG. 3 is an equivalent circuit diagram schematically illustrating a pixel circuit PC applicable to a display apparatus according to an embodiment.

Referring to FIG. 3, the pixel circuit PC may be connected to a display element, for example, an organic light-emitting diode OLED. The pixel circuit PC may include a driving thin-film transistor T1, a switching thin-film transistor T2, and a storage capacitor Cst. The organic light-emitting diode OLED may emit red, green, or blue light, or may emit red, green, blue, or white light.

The switching thin-film transistor T2 may include a gate electrode connected to a scan line SL, a first electrode connected to a data line DL, and a second electrode connected to a first node. The switching thin-film transistor T2 may provide, to the first node, a data signal or a data voltage input from the data line DL in response to a scan signal or a switching voltage input to the scan line SL. The storage capacitor Cst may be connected between the first node and a driving voltage line PL, and may store a voltage corresponding to a difference between a voltage received from the switching thin-film transistor T2 and a first power supply voltage ELVDD supplied to the driving voltage line PL.

The driving thin-film transistor T1 may include a gate electrode connected to the first node, a first electrode connected to the driving voltage line PL, and second electrode connected to a second node. The driving thin-film transistor T1 may control a driving current flowing from the driving voltage line PL to the organic light-emitting diode OLED in accordance with a voltage stored in the storage capacitor Cst. The organic light-emitting diode OLED may emit light having a certain brightness according to the driving current. An opposite electrode of the organic light-emitting diode OLED may receive a second power supply voltage ELVSS.

Although FIG. 3 illustrates that the pixel circuit PC includes two thin-film transistors and one storage capacitor, the pixel circuit PC may include at least three thin-film transistors.

Figure 4:
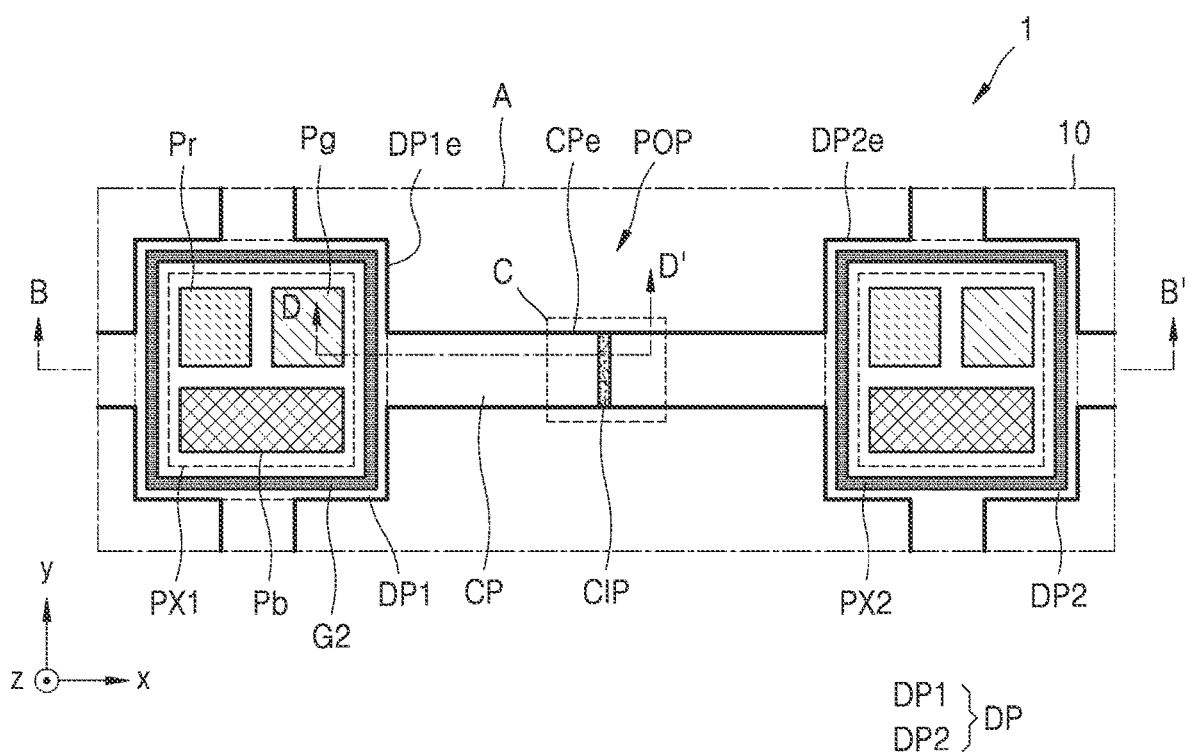
FIG. 4 is a schematic plan view of a display apparatus according to an embodiment.

FIG. 4 is a schematic plan view of the display apparatus 1 according to an embodiment. FIG. 4 is an enlarged view of a portion A of FIG. 2.

Referring to FIG. 4, the display panel 10 of the display apparatus 1 may include a display portion DP and a connection portion CP. The display portion DP may include the first display portion DP1 and the second display portion DP2. In an embodiment, the display panel 10 may include a plurality of first display portions DP1 and a plurality of second display portions DP2 arranged in a matrix configuration throughout a display area. In addition, the display panel 10 may include a plurality of connection portions CP.

The first pixel PX1 may be arranged in the first display portion DP1. The first display portion DP1 may be connected to the second display portion DP2 with the connection portion CP disposed therebetween. The first display portion DP1 may be connected to the connection portion CP. In an embodiment, the first display portion DP1 may be connected to at least one connection portion CP.

The second pixel PX2 may be arranged in the second display portion DP2. The second display portion DP2 may be spaced apart from the first display portion DP1. The second display portion DP2 may be connected to the connection portion CP. In an embodiment, the second display portion DP2 may be connected to at least one connection portion CP. The second display portion DP2 may have the same structure as or similar structure to that of the first display portion DP1.

The connection portion CP may extend from the first display portion DP1 to the second display portion DP2. The first display portion DP1 and the second display portion DP2 may be connected to each other by the connection portion CP. In an embodiment, when the display apparatus 1 includes the plurality of connection portions CP, the plurality of connection portions CP may be connected between the first display portion DP1 and the second display portion DP2. Some of the plurality of connection portions CP may connect the first display portion DP1 and/or the second display portion DP2 to other display portions.

Any one of the plurality of connection portions CP may extend in a first direction. Other one of the plurality of connection portions CP may extend in a second direction intersecting the first direction. In an embodiment, the first direction and the second direction may be orthogonal to each other. For example, the first direction may be a +x direction or −x direction of FIG. 4, and the second direction may be a +y direction or −y direction of FIG. 4. Alternatively, the first direction and the second direction may form an acute angle with each other or may form an obtuse angle with each other. Hereinafter, a case in which the first direction (e.g., +x direction or −x direction) and the second direction (e.g., +y direction or −y direction) are orthogonal to each other is mainly described in detail.

In an embodiment, the first display portion DP1 and the connection portion CP may constitute one basic unit. In this case, the basic unit may be repeatedly arranged in the first direction (e.g., +x direction or −x direction) and/or the second direction (e.g., +y direction or −y direction), and it may be understood that the display panel 10 may include a plurality of basic units arranged along the first direction and the second direction, and connected to adjacent basic units along the first direction and the second direction.

The penetrating opening portion POP may be defined in the display panel 10. The penetrating opening portion POP may be formed through the display panel 10. Accordingly, the penetrating opening portion POP may be an area in which components of the display panel 10 are not arranged. The display panel 10 may have a plurality of penetrating opening portions POP. Accordingly, the flexibility of the display panel 10 may be improved.

At least a portion of the penetrating opening portion POP may be defined by an edge DP1e of the first display portion DP1, an edge DP2e of the second display portion DP2, and an edge CPe of the connection portion CP. In an embodiment, the penetrating opening portion POP may have a closed curve shape. Alternatively, at least a portion of the penetrating opening portion POP may have an open shape.

A thickness of the connection portion CP may be less than a thickness of the first display portion DP1 and a thickness of the second display portion DP2. Accordingly, even when strain occurs in the connection portion CP, a maximum value of the strain that occurs in the connection portion CP may be reduced.

The first pixel PX1 and the second pixel PX2 may each include a red sub-pixel Pr, a green sub-pixel Pg, and a blue sub-pixel Pb. The red sub-pixel Pr, the green sub-pixel Pg, and the blue sub-pixel Pb may emit red light, green light, and blue light, respectively. Alternatively, the first pixel PX1 and the second pixel PX2 may each include the red sub-pixel Pr, the green sub-pixel Pg, the blue sub-pixel Pb, and a white sub-pixel. The red sub-pixel Pr, the green sub-pixel Pg, the blue sub-pixel Pb, and the white sub-pixel may emit red light, green light, blue light, and white light, respectively. Hereinafter, a case in which the first pixel PX1 and the second pixel PX2 each include the red sub-pixel Pr, the green sub-pixel Pg, and the blue sub-pixel Pb is mainly described in detail.

In an embodiment, the red sub-pixel Pr and the green sub-pixel Pg may each be arranged in a quadrangular shape, and the blue sub-pixel Pb may be arranged in a quadrangular shape having long sides in the first direction (e.g., +x direction or −x direction). In other words, a side of the red sub-pixel Pr and a side of the green sub-pixel Pg may be arranged to face one long side of the blue sub-pixel Pb. In an embodiment, the red sub-pixel Pr and the green sub-pixel Pg may be arranged in a first row, and the blue sub-pixel Pb may be arranged in a second row adjacent to the first row.

Alternatively, a sub-pixel arrangement structure of the first pixel PX1 may be an S-stripe structure. For example, the blue sub-pixel Pb may be arranged in a first column, and the red sub-pixel Pr and the green sub-pixel Pg may be arranged in a second column adjacent to the first column. In this case, the blue sub-pixel Pb may be arranged in a quadrangular shape having long sides in the second direction (e.g., +y direction or −y direction), and the red sub-pixel Pr and the green sub-pixel Pg may each be arranged in a quadrangular shape.

Alternatively, the sub-pixel arrangement structure of the first pixel PX1 may be in a stripe structure. For example, the red sub-pixel Pr, the green sub-pixel Pg, and the blue sub-pixel Pb may be arranged in parallel in the first direction (e.g., +x direction or −x direction) or the second direction (e.g., +y direction or −y direction). Alternatively, the sub-pixel arrangement structure of the first pixel PX1 may be a Pentile™ structure.

Referring to FIG. 4, the edge CPe of the connection portion CP may extend in an extension direction of the connection portion CP. For example, when the connection portion CP extends in the first direction (e.g., +x direction or −x direction), the edge CPe of the connection portion CP may also extend in the first direction (e.g., +x direction or −x direction). In addition, when the connection portion CP extends in the second direction (e.g., +y direction or −y direction), the edge CPe of the connection portion CP may also extend in the second direction (e.g., +y direction or −y direction).

At least one crack inducing pattern CIP may be disposed in a central portion of the connection portion CP (which may correspond to the connection area of the substrate 100 shown in FIG. 2) and include a first groove G1 which will be described in detail below with reference to FIGS. 8 and 9. The crack inducing pattern CIP may improve the flexibility of the connection portion CP by causing cracks of an inorganic insulating layer disposed on the connection portion CP. As an embodiment, when the connection portion CP extends in the first direction (e.g., +x direction or −x direction), the crack inducing pattern CIP may extend in the second direction (e.g., +y direction or −y direction).

A second groove G2 surrounding the first pixel PX1 and the second pixel PX2 may be disposed at a perimeter of each of the first display portion DP1 and the second display portion DP2. As an embodiment, the second groove G2 may have a closed loop shape that completely surrounds each of the first pixel PX1 and the second pixel PX2 along an edge of the first display portion DP1. The second groove G2 may prevent impurities and/or moisture from penetrating into the first display portion DP1 and the second display portion DP2 from the outside.

Detailed structures of the crack inducing pattern CIP and the second groove G2 will be described in detail below with reference to FIGS. 8 and 9 or the like.

Figure 5A:
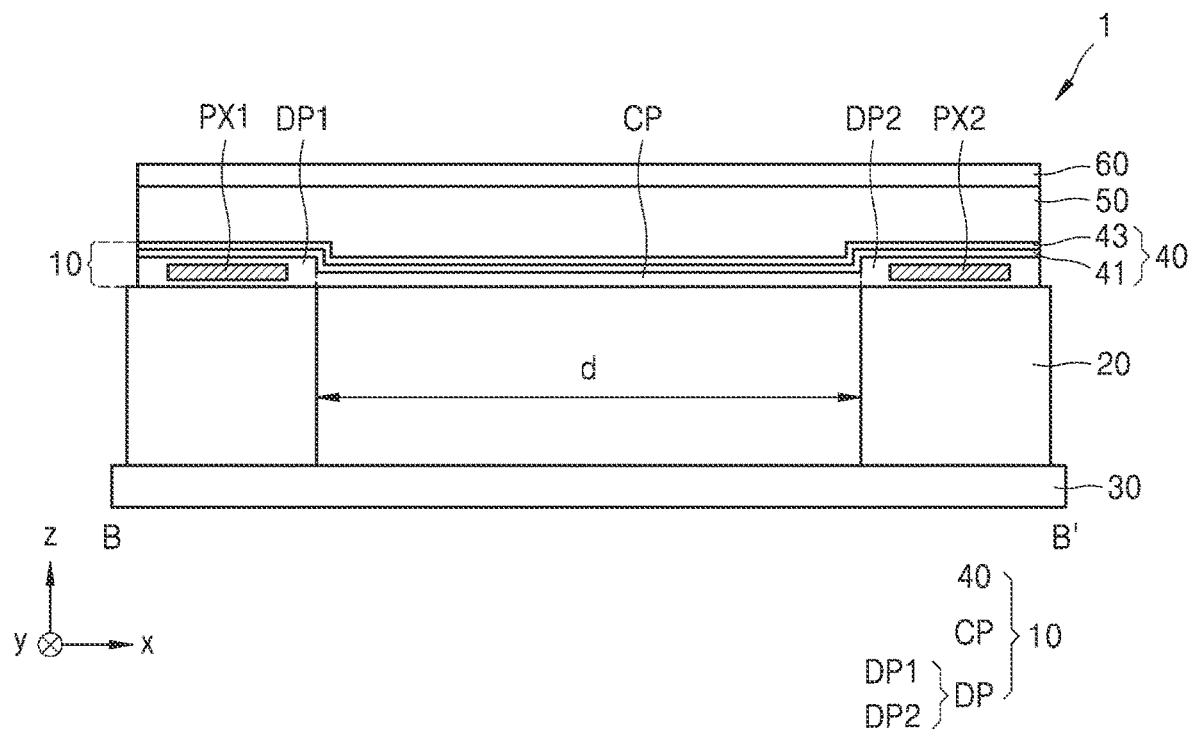
FIGS. 5A and 5B are schematic cross-sectional views of a display apparatus according to an embodiment.
Figure 5B:
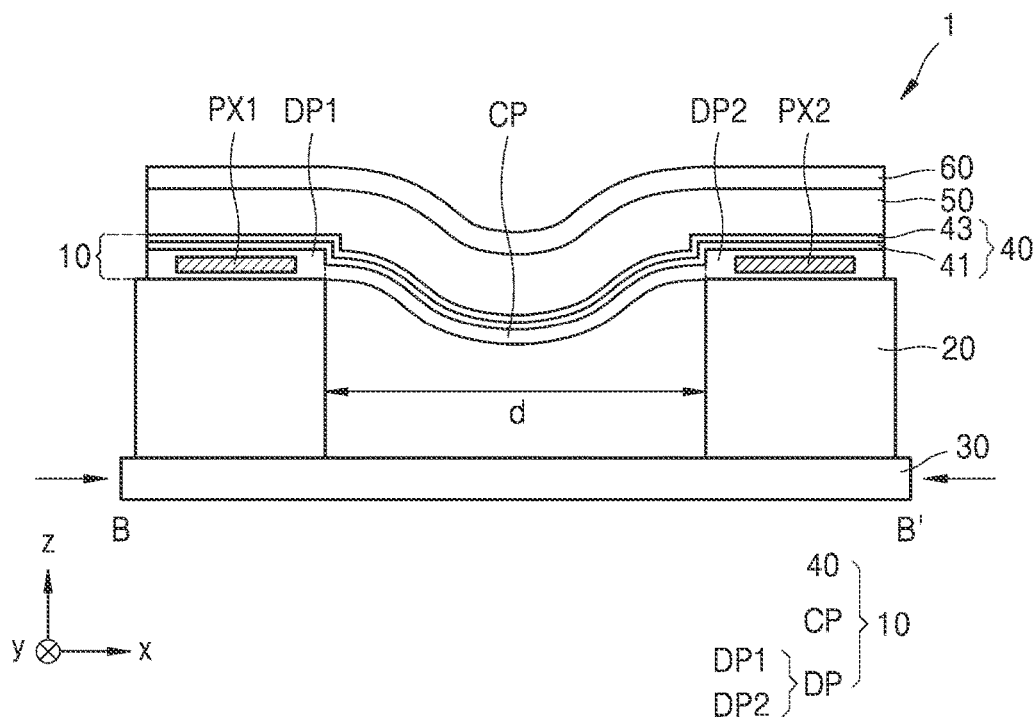

FIGS. 5A and 5B are schematic cross-sectional views of the display apparatus 1 according to an embodiment.

Figure 6:
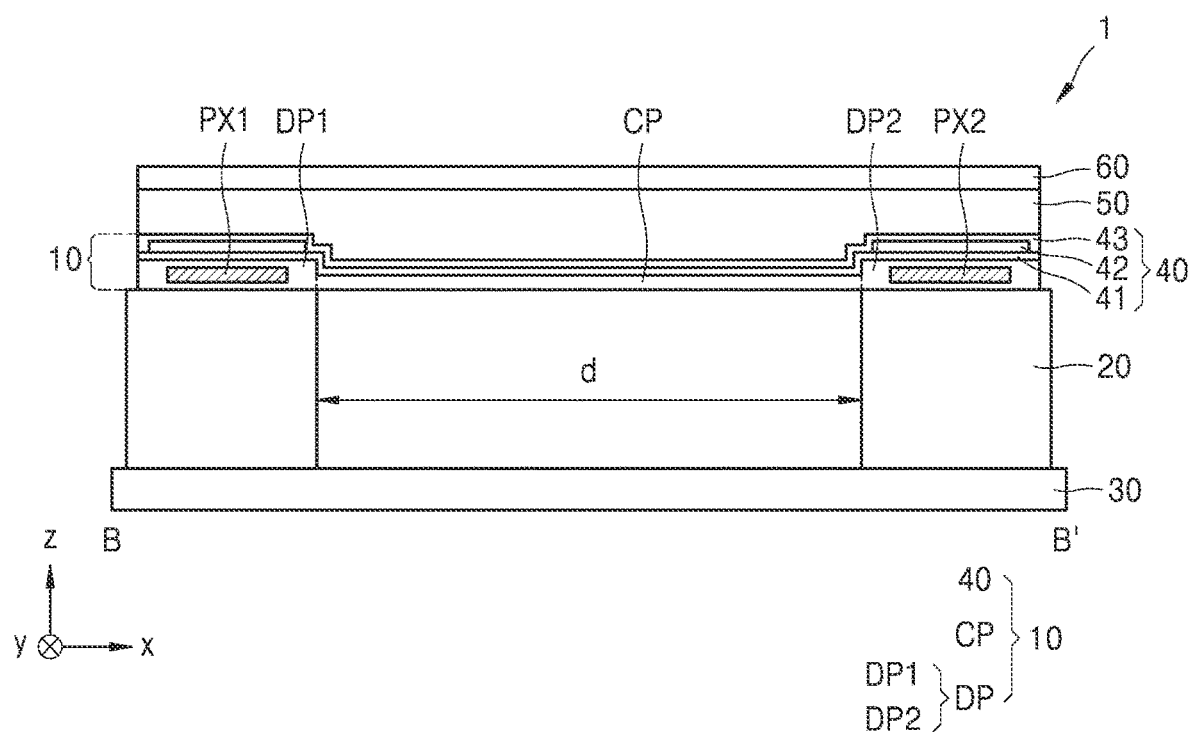
FIG. 6 is a modified embodiment of FIG. 5A.

In particular, FIGS. 5A and 5B are diagrams each showing a cross-section taken along line B-B' of FIG. 4. FIG. 5A shows the display apparatus 1 before an external force is applied to the display apparatus 1, and FIG. 5B shows the display apparatus 1 after an external force is applied to the display apparatus 1. In addition, an embodiment of FIG. 6 is different from an embodiment of FIG. 5A in a structure of an encapsulation layer. Hereinafter, descriptions will be made with reference to FIG. 5A, and the difference in the structure of an encapsulation layer will be mainly described with respect to FIG. 6.

Referring to FIG. 5A, the display apparatus 1 may include the display panel 10, a pillar layer 20, a flexible substrate 30, an optical functional layer 50, and the cover window 60.

The display panel 10 may include the display portion DP, the connection portion CP, and an encapsulation layer 40, and the display portion DP may include the first display portion DP1 and the second display portion DP2. In addition, the first pixel PX1 may be arranged in the first display portion DP1 and the second pixel PX2 may be arranged in the second display portion DP2. The first display portion DP1 and the second display portion DP2 may be portions that display images through the first pixel PX1 and the second pixel PX2, respectively. The connection portion CP may connect the first display portion DP1 to the second display portion DP2. The first display portion DP1 and the second display portion DP2 may be connected to each other through the connection portion CP.

Figure 9:
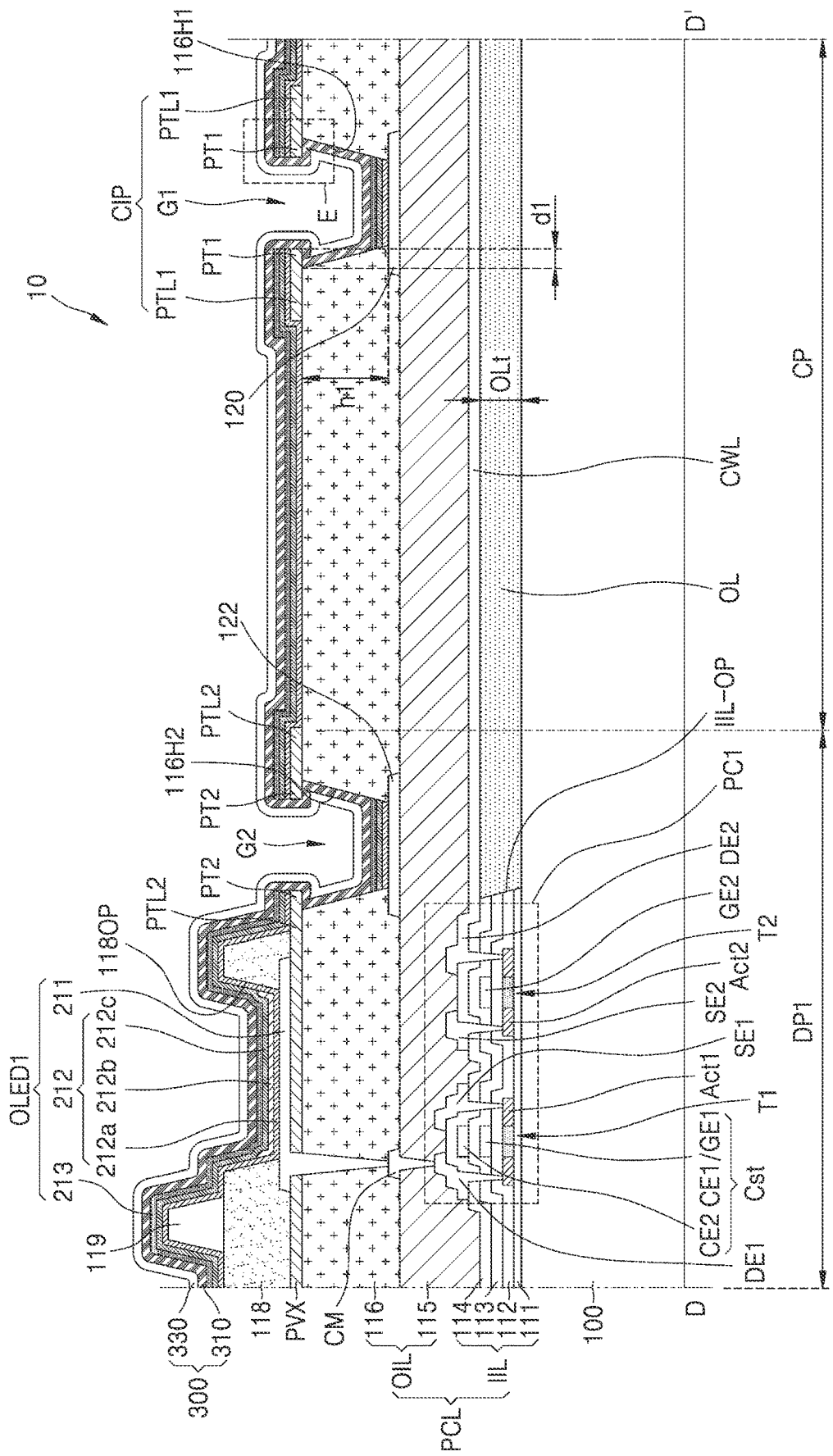
FIG. 9 is a schematic cross-sectional view of a display apparatus according to the present embodiment.

As shown in FIG. 9 to be described below, the display portion DP of the display panel 10 may include insulating layers. Some of the insulating layers of the first display portion DP1 may be removed in the connection portion CP. Accordingly, because some insulating layers may be removed in the connection portion CP, a thickness of the connection portion CP may be less than a thickness of the display portion DP.

The pillar layer 20 may be disposed below the display panel 10. The pillar layer 20 may support the display panel 10. Even when an external force is applied to the display apparatus 1, the shape of the pillar layer 20 may not be changed.

In an embodiment, the pillar layer 20 may be disposed below the display portion DP of the display panel 10. That is, the pillar layer 20 may overlap the display portion DP and may not overlap the connection portion CP. A plurality of pillar layers 20 may be spaced apart from each other. The plurality of pillar layers 20 may be respectively disposed below a plurality of display portions DP which are spaced apart from each other.

The flexible substrate 30 may be disposed below the pillar layer 20. The flexible substrate 30 may overlap the display portion DP and the connection portion CP. The flexible substrate 30 may include a flexible material. The flexible substrate 30 may have higher flexibility than that of the pillar layer 20.

The encapsulation layer 40 may be disposed on the display portion DP and the connection portion CP. The encapsulation layer 40 may be disposed over the first display area, the second display area and the connection area of the substrate 100 (refer to FIG. 2) to cover the crack inducing pattern CIP. The encapsulation layer 40 may cover the first and second pixels PX1 and PX2. In an embodiment, the encapsulation layer 40 may include at least one inorganic film layer. The at least one inorganic film layer may include one or more inorganic insulating materials such as silicon oxide ($SiO_X$), silicon nitride ($SiN_X$), silicon oxynitride (Si-$O_XN_Y$), aluminum oxide ($Al_2O_3$), titanium oxide ($TiO_2$), tantalum oxide ($Ta_2O_5$), hafnium oxide ($HfO_2$), or zinc oxide ($ZnO_X$), and may be formed by chemical vapor deposition (CVD) or the like. The zinc oxide ($ZnO_X$) may be zinc oxide (ZnO), and/or zinc peroxide ($ZnO_2$).

In an embodiment, as shown in FIG. 5A, the encapsulation layer 40 may be disposed on the display portion DP and the connection portion CP. The encapsulation layer 40 may include a first inorganic encapsulation layer 41 and a second inorganic encapsulation layer 43. Alternatively, as shown in FIG. 6, the encapsulation layer 40 may include the first inorganic encapsulation layer 41, the second inorganic encapsulation layer 43, and an organic encapsulation layer 42 disposed between the first inorganic encapsulation layer 41 and the second inorganic encapsulation layer 43. When the encapsulation layer 40 includes the organic encapsulation layer 42, the organic encapsulation layer 42 may only be disposed on the display portion DP and may not be disposed on the connection portion CP. That is, only the first inorganic encapsulation layer 41 and the second inorganic encapsulation layer 43 may be disposed on the connection portion CP.

The optical functional layer 50 may be disposed on the encapsulation layer 40. The optical functional layer 50 may include an anti-reflection layer. The anti-reflection layer may reduce the reflectance of light (external light) incident from the outside toward the display apparatus 1. In an embodiment, the optical functional layer 50 may include a polarizing film. Alternatively, the optical functional layer 50 may include a filter plate including a black matrix and color filters.

Although not illustrated in FIG. 5A, a touchscreen layer may be disposed between the encapsulation layer 40 and the optical functional layer 50. The touchscreen layer may obtain coordinate information according to an external input, for example, a touch event. The touchscreen layer may include touch electrodes and touch wires connected to the touch electrodes. The touchscreen layer may sense an external input by using a self-capacitive method or a mutual capacitive method.

The cover window 60 may be disposed on the optical functional layer 50. The cover window 60 may protect the display panel 10.

As shown in FIG. 5B, when an external force is applied to the display apparatus 1 (for example, when an external force is applied to the flexible substrate 30), shapes and/or positions of some members of the display apparatus 1 may be changed. For example, when pressure is applied to the flexible substrate 30, a distance between the display portions DP of the display panel 10 or a distance d between the pillar layers 20 may decrease. In addition, the connection portion CP of the display panel 10 may be bent. At least a portion of the encapsulation layer 40, at least a portion of the optical functional layer 50, and/or at least a portion of the cover window 60 may be bent.

As such, when an external force is applied to the display apparatus 1, a distance between the display portions DP of the display panel 10 and the distance d between the pillar layers 20 may be changed, and the shape of each of the display portions DP of the display panel 10 and the pillar layers 20 may not be changed. Accordingly, because the shape of each of the display portion DP and the pillar layer 20 is not changed, the first and second pixels PX1 and PX2 arranged in the display portions DP may be protected. The display apparatus 1 may be changed into various shapes while protecting the first and second pixels PX1 and PX2.

Figure 7:
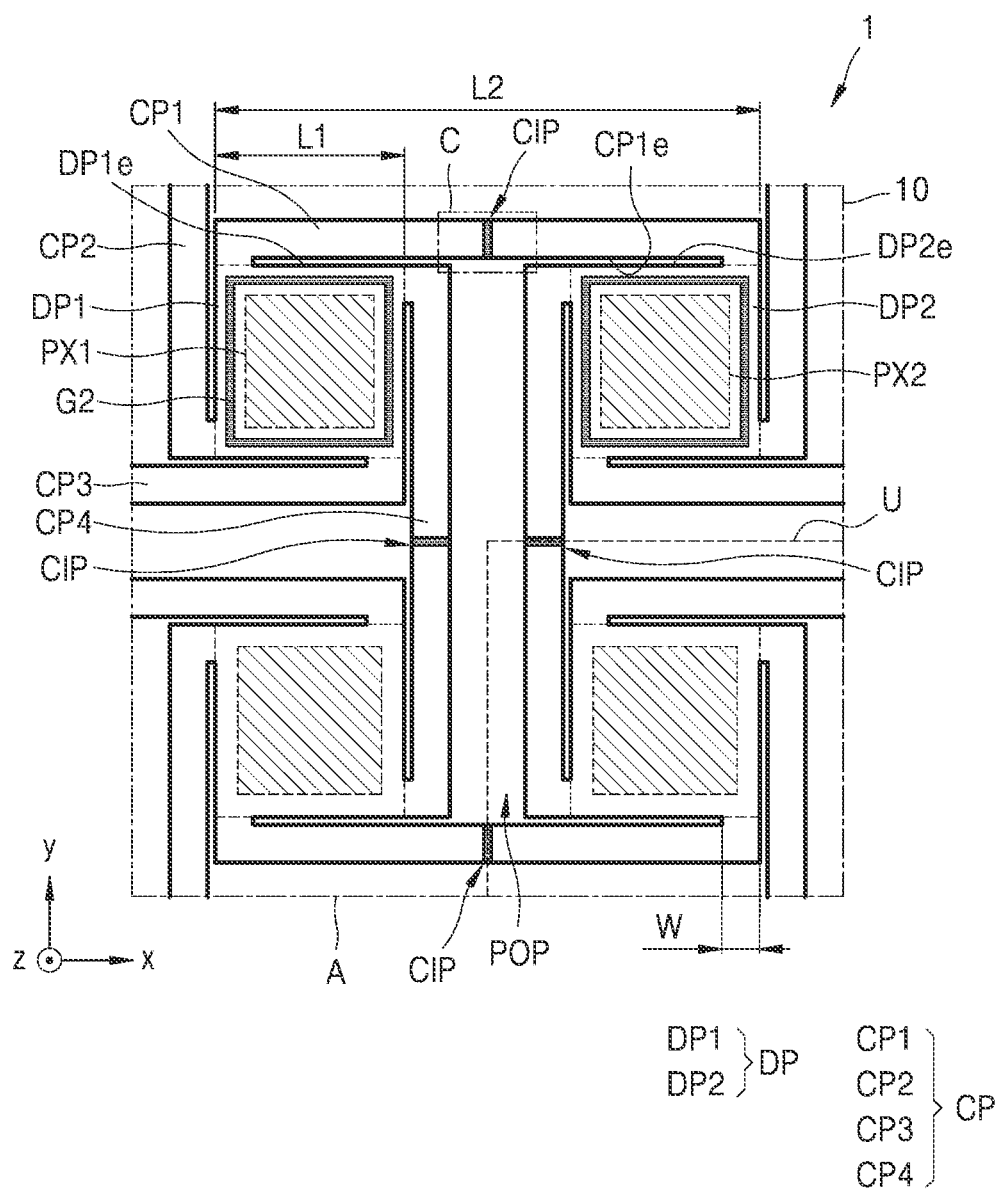
FIG. 7 is a schematic plan view of a display apparatus according to an embodiment.

FIG. 7 is a schematic plan view of the display apparatus according to an embodiment. FIG. 7 is a modified embodiment of FIG. 4 and an enlarged view of a portion A of FIG. 2.

Referring to FIG. 7, the display panel 10 of the display apparatus 1 may include the display portion DP and the connection portion CP. The display portion DP may include the first display portion DP1 and the second display portion DP2. The first pixel PX1 may be arranged in the first display portion DP1 and the second pixel PX2 may be arranged in the second display portion DP2. The connection portion CP may include a first connection portion CP1, a second connection portion CP2, a third connection portion CP3, and a fourth connection portion CP4.

The plurality of display portions DP may be spaced apart from each other in the first direction (e.g., +x direction or −x direction) and/or the second direction (e.g., +y direction or −y direction). For example, the first display portion DP1 and the second display portion DP2 may be spaced apart from each other in the first direction (e.g., +x direction or −x direction).

The connection portion CP may extend between adjacent display portions DP. In an embodiment, each display portion DP may be connected to four connection portions CP (CP1, CP2, CP3 and CP4). The four connection portions CP connected to one display portion DP may extend in different directions, and each of the four connection portions CP may be connected to other display portions DP arranged adjacent to the one display portion DP.

In an embodiment, the first connection portion CP1 may extend from the first display portion DP1 to the second display portion DP2. Accordingly, the first display portion DP1 and the second display portion DP2 may be connected to each other by the first connection portion CP1, and the first display portion DP1, the second display portion DP2, and the first connection portion CP1 may be integrally provided.

The penetrating opening portion POP may be defined in the display panel 10. The first display portion DP1 and the second display portion DP2 may be spaced apart from each other with the penetrating opening portion POP and the connection portions CP disposed therebetween. The penetrating opening portion POP may be formed through the display panel 10. Accordingly, the penetrating opening portion POP may be an area in which components of the display panel 10 are not arranged.

In an embodiment, at least a portion of the penetrating opening portion POP may be defined by edges of the display portions DP and edges of the connection portions CP. For example, at least a portion of the penetrating opening portion POP may be defined by the edge DP1e of the first display portion DP1, the edge DP2e of the second display portion DP2, and an edge CP1e of the first connection portion CP1.

One display portion DP and some connection portions CP extending therefrom may constitute one basic unit U. The basic unit U may be repeatedly arranged in the first direction (e.g., +x direction or -x direction) and the second direction (e.g., +y direction or -y direction), and it may be understood that the display panel 10 (refer to FIG. 2) may include a plurality of basic units arranged along the first direction and the second direction, and connected to adjacent basic units along the first direction and the second direction. Two basic units U adjacent to each other may be symmetrical to each other. For example, in FIG. 7, two basic units U adjacent to each other in a horizontal direction in FIG. 7 may be horizontally symmetrical to each other with respect to an axis of symmetry disposed between the two basic units U, the axis of symmetry being parallel to the second direction (e.g., +y direction or -y direction). Similarly, in FIG. 7, two basic units U adjacent to each other in a vertical direction may be vertically symmetrical to each other with respect to an axis of symmetry disposed between the two basic units U, the axis of symmetry being parallel to the first direction (e.g., +x direction or -x direction).

In an embodiment, a ratio of a length L1 of the display portion DP in the first direction (e.g., +x direction or -x direction) to a length L2 of the connection portion CP in the first direction may be about 100:1 to about 1:100. In addition, a ratio of the length L1 of the display portion DP in the first direction (e.g., +x direction or -x direction) to the length L2 of the connection portion CP may be equal to a ratio of the length L1 of the display portion DP in the second direction (e.g., +y direction or -y direction) to the length L2 of the connection portion CP in the second direction. However, the present disclosure is not limited thereto. For example, the ratio of the length L1 of the display portion DP in the first direction (e.g., +x direction or -x direction) to the length L2 of the connection portion CP in the first direction may also be different from the ratio of the length L1 of the display portion DP in the second direction (e.g., +y direction or -y direction) to the length L2 of the connection portion CP in the second direction.

Although not illustrated in FIG. 7, the first pixel PX1 and the second pixel PX2 may each include the red sub-pixel Pr (refer to FIG. 4), the green sub-pixel Pg (refer to FIG. 4), and the blue sub-pixel Pb (refer to FIG. 4). The red sub-pixel Pr, the green sub-pixel Pg, and the blue sub-pixel Pb may emit red light, green light, and blue light, respectively. Alternatively, the first pixel PX1 and the second pixel PX2 may each include the red sub-pixel Pr, the green sub-pixel Pg, the blue sub-pixel Pb, and a white sub-pixel. The red sub-pixel Pr, the green sub-pixel Pg, the blue sub-pixel Pb, and the white sub-pixel may emit red light, green light, blue light, and white light, respectively.

In an embodiment, a width W of a connection part where the connection portion CP and the display portion DP are connected may be maintained greater than or equal to 1 μm to ensure required conductivity of a connection line CWL (refer to FIG. 9) arranged in the connection part. By securing the width of the connection part, the connection line CWL may not be exposed and be prevented from disconnection. Accordingly, the width W of the connection part where the connection portion CP and the display portion DP are connected may be 1 μm or more.

The crack inducing pattern CIP may be disposed at a central portion of the connection portion CP. The crack inducing pattern CIP may improve the flexibility of the connection portion CP by causing cracks of an inorganic insulating layer disposed on the connection portion CP.

Figure 8:
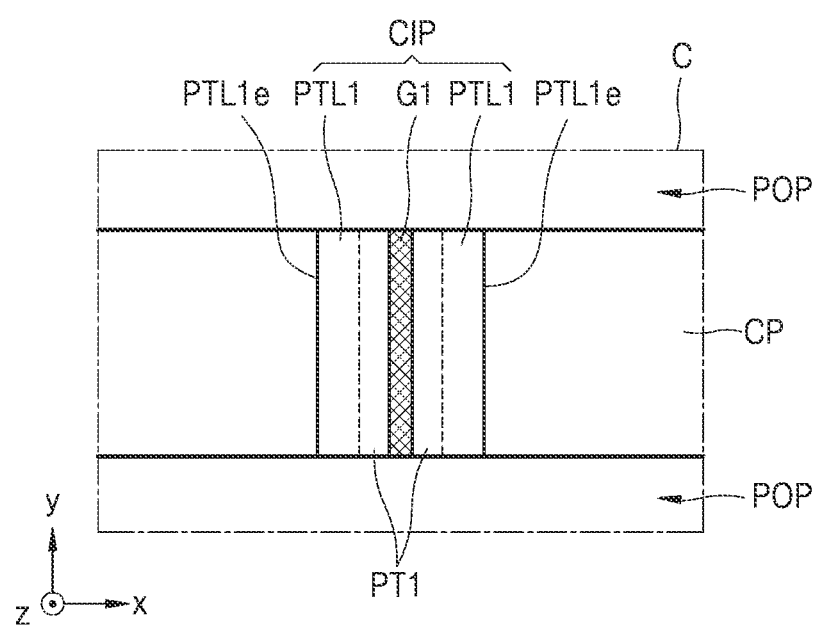
FIG. 8 is a schematic plan view of a crack inducing pattern according to the present embodiment.

FIG. 8 is a schematic plan view of a crack inducing pattern according to the present embodiment. FIG. 8 is an enlarged view of a portion C of FIG. 4, but may also be equally applied to a portion C of FIG. 7.

The crack inducing pattern CIP may include a first groove G1 and a first pattern layer PTL1 disposed on the first groove G1. The first groove G1 may be formed by etching a portion of a second organic insulating layer 116 (refer to FIG. 9). A pair of first pattern layers PTL1 may be formed and arranged on both sides of the first groove G1 with the first groove G1 disposed therebetween. As shown in FIG. 8, the connection portion CP may extend in the first direction (e.g., +x direction or -x direction), and the crack inducing pattern CIP may extend in the second direction (e.g., +y direction or -y direction). That is, a direction in which the connection portion CP extends may intersect with or be orthogonal to a direction in which the crack inducing pattern CIP extends.

Although FIG. 8 illustrates that one crack inducing pattern CIP is provided, in another embodiment, a plurality of crack inducing patterns CIP may be provided in a central portion of the connection portion CP.

In an embodiment, in a plan view, the first groove G1 and the first pattern layer PTL1 may have a straight bar shape. The first groove G1 may extend in a straight line in the second direction (e.g., +y direction or -y direction), and the first pattern layer PTL1 may extend along an outer edge of the first groove G1. The first pattern layer PTL1 may be provided in a pair along both outer edges of the first groove G1 in a plan view.

Each of the pair of first pattern layers PTL1 may have an end portion protruding toward a center of the first groove G1, and end portions of the pair of first pattern layers PTL1 may form a pair of eaves-shaped protruding tips (hereinafter, referred to as first tips PT1). A protrusion length d1 (refer to FIG. 9) of each of the pair of first tips PT1 may be less than a depth h1 (refer to FIG. 9) of the first groove G1, which will be described below. For example, the protrusion length d1 of the first tip PT1 may be, for example, about 1 μm to about 1.5 μm.

In the first pattern layer PTL1, the other end portion PTL1e opposite to an end portion at which the first tip PT1 is formed may be exposed as shown in FIG. 8. As another embodiment, the other end portion PTL1e may also be covered with a material such as an organic insulating layer.

Figure 10:
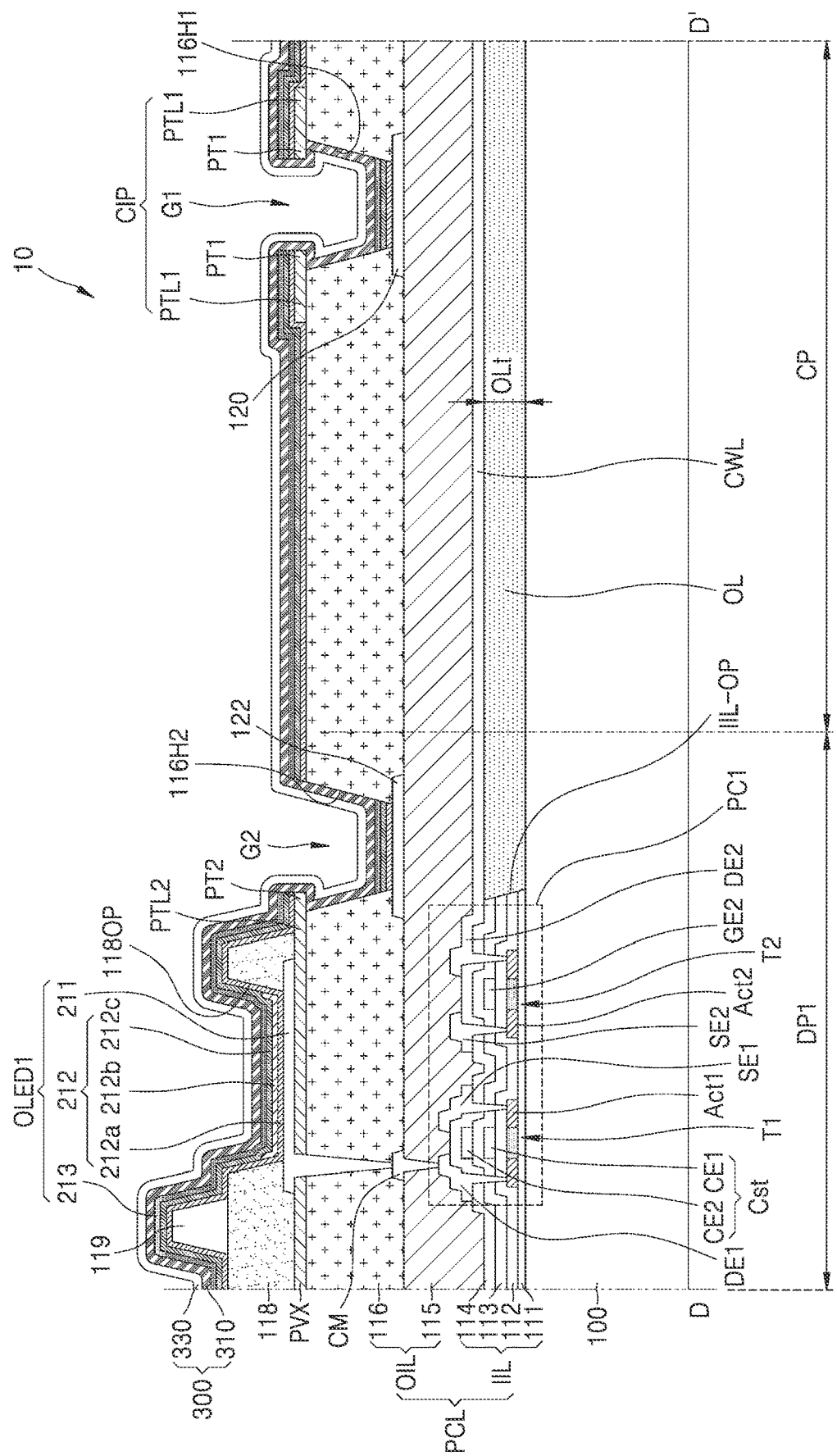
FIG. 10 is a modified embodiment of FIG. 9.

FIG. 9 is a schematic cross-sectional view of a display apparatus according to an embodiment, and FIG. 10 is a modified embodiment of FIG. 9. FIG. 9 is a cross-sectional view of the display apparatus taken along line D-D' of FIG. 4.

Referring to FIG. 9, the display panel 10 may include the substrate 100, a pixel circuit layer PCL, a display element layer, and an encapsulation layer 300 which, for example, may correspond to the encapsulation layer 40 described above with reference to FIGS. 5A and 5B.

In an embodiment, the substrate 100 may include at least one base layer. In an embodiment, the barrier layer may be disposed on the base layer. In another embodiment, the substrate 100 may include glass.

The base layer may include a polymer resin, such as polyethersulfone, polyarylate, polyetherimide, polyethylene naphthalate, polyethylene terephthalate, polyphenylene sulfide, polyimide, polycarbonate, cellulose triacetate, cellulose acetate propionate, or the like.

The barrier layer is a barrier layer that prevents penetration of external foreign materials, and may include a single layer or a multilayer, each including an inorganic material, such as silicon nitride ($SiN_x$), silicon oxide ($SiO_2$), and/or silicon oxynitride ($SiO_xN_y$).

The pixel circuit layer PCL may be arranged in the display portion (e.g., the first display portion DP1). The pixel circuit layer PCL may include a pixel circuit. In an embodiment, the pixel circuit layer PCL may include a plurality of pixel circuits. A first pixel circuit PC1 among the plurality of pixel circuits may include a driving thin-film transistor T1, a switching thin-film transistor T2, and a storage capacitor Cst. Although a stacked structure on the first display portion DP1 is described with reference to FIG. 9, the stacked structure may also be applied to the second display portion DP2 (refer to FIG. 7).

The pixel circuit layer PCL may include an inorganic insulating layer IIL and an organic insulating layer OIL which are disposed below and/or above components of the driving thin-film transistor T1. The inorganic insulating layer IIL may include the buffer layer 111, a first gate insulating layer 112, a second gate insulating layer 113, and an interlayer insulating layer 114. The organic insulating layer OIL may include a first organic insulating layer 115 and a second organic insulating layer 116. The driving thin-film transistor T1 may include a first semiconductor layer Act1, a first gate electrode GE1, a first source electrode SE1, and a first drain electrode DE1.

The buffer layer 111 may be disposed on the substrate 100. The buffer layer 111 may include an inorganic insulating material such as silicon nitride ($SiN_x$), silicon oxynitride (SiON), or silicon oxide ($SiO_2$), and may include a single layer or a multi-layer each including the inorganic insulating material stated above.

The first semiconductor layer Act1 may be disposed on the buffer layer 111. The first semiconductor layer Act1 may include polysilicon. Alternatively, the first semiconductor layer Act1 may include an amorphous silicon, an oxide semiconductor, an organic semiconductor, or the like. The first semiconductor layer Act1 may include a channel area, a drain area, and a source area, the drain area and the source area being respectively arranged on both sides of the channel area.

The first gate electrode GE1 may overlap the channel area of driving thin-film transistor T1. The first gate electrode GE1 may include a low-resistance metal material. The first gate electrode GE1 may include a conductive material including molybdenum (Mo), aluminum (Al), copper (Cu), titanium (Ti), or the like, and may be a multi-layer or a single layer, each including the material stated above.

The first gate insulating layer 112 disposed between the first semiconductor layer Act1 and the first gate electrode GE1 may include an inorganic insulating material, such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), and/or zinc oxide (ZnO), or the like.

The second gate insulating layer 113 may cover the first gate electrode GEL. Similar to the first gate insulating layer 112, the second gate insulating layer 113 may include an inorganic insulating material, such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), and/or zinc oxide (ZnO), or the like.

An upper electrode CE2 of the storage capacitor Cst may be disposed on the second gate insulating layer 113. The upper electrode CE2 may overlap the first gate electrode GE1 which is disposed below the upper electrode CE2. The first gate electrode GE1 of the driving thin-film transistor T1 and the upper electrode CE2 overlapping each other with the second gate insulating layer 113 disposed therebetween may form the storage capacitor Cst. That is, the first gate electrode GE1 of the driving thin-film transistor T1 may function as a lower electrode CE1 of the storage capacitor Cst.

As such, the storage capacitor Cst and the driving thin-film transistor T1 may overlap each other. In some embodiments, the storage capacitor Cst may not overlap the driving thin-film transistor T1.

The upper electrode CE2 may include Al, platinum (Pt), palladium (Pd), silver (Ag), magnesium (Mg), gold (Au), nickel (Ni), neodymium (Nd), iridium (Ir), chromium (Cr), calcium (Ca), Mo, Ti, tungsten (W), and/or Cu, and may be a single layer or a multi-layer, each including the material stated above.

The interlayer insulating layer 114 may cover the upper electrode CE2. The interlayer insulating layer 114 may include an inorganic insulating material, such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide (ZnO), or the like. The interlayer insulating layer 114 may include a single layer or a multi-layer, each including the inorganic insulating materials stated above.

The first drain electrode DE1 and the first source electrode SE1 may each be disposed on the interlayer insulating layer 114. The first drain electrode DE1 and the first source electrode SE1 may each include a material having good conductivity. The first drain electrode DE1 and the first source electrode SE1 may each include a conductive material including Mo, Al, Cu, Ti, or the like, and may include a multi-layer or a single layer, each including the above material. As an embodiment, the first drain electrode DE1 and the first source electrode SE1 may each have a multi-layered structure of Ti/Al/Ti.

The switching thin-film transistor T2 may include a second semiconductor layer Act2, a second gate electrode GE2, a second drain electrode DE2, and a second source electrode SE2. Because the second semiconductor layer Act2, the second gate electrode GE2, the second drain electrode DE2, and the second source electrode SE2 are respectively similar to the first semiconductor layer Act1, the first gate electrode GE1, the first drain electrode DE1, and the first source electrode SE1, detailed descriptions thereof are omitted.

The first organic insulating layer 115 may cover the first drain electrode DE1 and the first source electrode SE1. The first organic insulating layer 115 may include an organic material. For example, the first organic insulating layer 115 may include a general commercial polymer such as poly (methyl methacrylate) (PMMA) or polystyrene (PS), a polymer derivative having a phenol group, and an organic insulating material such as an acrylic polymer, an imide polymer, an aryl ether polymer, an amide polymer, a fluorine polymer, a p-xylene polymer, a vinyl alcohol polymer, and a mixture thereof.

The second organic insulating layer 116 may include an organic material. The second organic insulating layer 116 may include a general commercial polymer such as poly (methyl methacrylate) (PMMA) or polystyrene (PS), a polymer derivative having a phenol group, and an organic insulating material, such as an acrylic polymer, an imide polymer, an aryl ether polymer, an amide polymer, a fluorine polymer, a p-xylene polymer, a vinyl alcohol polymer, and a mixture thereof.

In an embodiment, a passivation layer PVX may be disposed on the second organic insulating layer 116. The passivation layer PVX may include a single film or a multi-layered film each including an inorganic material such as silicon nitride ($SiN_x$) and/or silicon oxide ($SiO_2$), or the like.

The passivation layer PVX may be arranged between a first organic light-emitting diode OLED1 and the second organic insulating layer 116. A pixel electrode 211 of the first organic light-emitting diode OLED1 may be disposed on the passivation layer PVX. The passivation layer PVX may be arranged on the same layer as the first pattern layer PTL1 and a second pattern layer PTL2 which will be described below. That is, a portion of the passivation layer PVX may be patterned on the first groove G1 and the second groove G2 to provide the first pattern layer PTL1 and the second pattern layer PTL2, respectively.

In an embodiment, the passivation layer PVX may be removed from the connection portion CP except for the first pattern layer PTL1 and the second pattern layer PTL2 for respectively forming a first tip PT1 and a second tip PT2 on the first groove G1 and the second groove G2.

The display element layer may be disposed on the pixel circuit layer PCL. The display element layer may include a display element. In an embodiment, the display element layer may include a plurality of display elements. The first organic light-emitting diode OLED1 as a first display element may be arranged in the first display portion DP1.

Although not illustrated in FIG. 9, a second organic light-emitting diode, as a second display element, may be arranged in the second display portion DP2 (refer to FIG. 7). A structure of the second organic light-emitting diode may be the same as that of the first organic light-emitting diode OLED1.

The pixel electrode 211 of the first organic light-emitting diode OLED1 may be disposed on the passivation layer PVX. The pixel electrode 211 may be electrically connected to a connection metal CM which is connected to the first drain electrode DE1 through a contact hole in the second organic insulating layer 116 and the passivation layer PVX. Accordingly, the first organic light-emitting diode OLED1 may be electrically connected to the first pixel circuit PC1.

The pixel electrode 211 may include a conductive oxide such as indium tin oxide (ITO), indium zinc oxide (IZO), zinc oxide (ZnO), indium oxide ($In_2O_3$), indium gallium oxide (IGO), or aluminum zinc oxide (AZO). As another embodiment, the pixel electrode 211 may include a reflective film including Ag, Mg, Al, Pt, Pd, Au, Ni, Nd, Ir, Cr, or a compound thereof. As another embodiment, the pixel electrode 211 may further include a film including ITO, IZO, ZnO, or $In_2O_3$ above/below the reflective film stated above.

A pixel defining film 118 having an opening 1180P exposing a central portion of the pixel electrode 211 may be disposed on the pixel electrode 211. The pixel defining film 118 may include an organic insulating material and/or an inorganic insulating material. The opening 1180P thereof may define an emission area of light emitted from the first organic light-emitting diode OLED1. For example, a width of the opening 1180P may correspond to a width of the emission area.

A spacer 119 may be disposed on the pixel defining film 118. During a manufacturing of the display panel 10, a mask sheet may be used. At this time, the mask sheet may be in close contact with the spacer 119. The spacer 119 may prevent the substrate 100 and a portion of the multi-layered film on the substrate 100 from damaging by the mask sheet when a deposition material is deposited on the substrate 100.

The spacer 119 may include an organic material such as polyimide. Alternatively, the spacer 119 may include an inorganic insulating material such as silicon nitride ($SiN_x$) or silicon oxide ($SiO_2$), or may include an organic insulating material and an inorganic insulating material.

In an embodiment, the spacer 119 may include a material different from that of the pixel defining film 118. In another embodiment, the spacer 119 may include the same material as that of the pixel defining film 118. In this case, the pixel defining film 118 and the spacer 119 may be formed together using a halftone mask or the like.

An intermediate layer 212 may be disposed on the pixel defining film 118. The intermediate layer 212 may include an emission layer 212b arranged in the opening 1180P of the pixel defining film 118. The emission layer 212b may include a polymer organic material or a low-molecular-weight organic material which emits light of a certain color.

A first functional layer 212a and a second functional layer 212c may be respectively disposed below and above the emission layer 212b. The first functional layer 212a may include, for example, a hole transport layer (HTL), or an HTL and a hole injection layer (HIL). The second functional layer 212c, as a component disposed on the emission layer 212b, is optional. The second functional layer 212c may include an electron transport layer (ETL) and/or an electron injection layer (EIL). Similar to an opposite electrode 213 to be described below, the first functional layer 212a and/or the second functional layer 212c may be a common layer entirely covering the substrate 100.

The opposite electrode 213 may include a conductive material having a low work function. For example, the opposite electrode 213 may include a (semi)transparent layer, the (semi)transparent layer including Ag, Mg, Al, Pt, Pd, Au, Ni, Nd, Ir, Cr, lithium (Li), Ca, alloys thereof, or the like. Alternatively, the opposite electrode 213 may further include a layer such as ITO, IZO, ZnO, or $In_2O_3$ above the (semi)transparent layer including the material stated above.

In some embodiments, a capping layer (not shown) may be further disposed on the opposite electrode 213. The capping layer may include lithium fluoride (LiF), an inorganic material, or/and an organic material.

The encapsulation layer 300 may be disposed on the opposite electrode 213. In an embodiment, the encapsulation layer 300 may include at least one inorganic encapsulation layer. In another embodiment, the encapsulation layer 300 may include at least one inorganic encapsulation layer and at least one organic encapsulation layer. In an embodiment, FIG. 9 illustrates that the encapsulation layer 300 includes a first inorganic encapsulation layer 310 and a second inorganic encapsulation layer 330 which are sequentially stacked. In FIG. 9, the second inorganic encapsulation layer 330 is directly disposed on the first inorganic encapsulation layer 310, and thus, the first inorganic encapsulation layer 310 and the second inorganic encapsulation layer 330 may be in direct contact with each other on the first organic light-emitting diode OLED1.

The first inorganic encapsulation layer 310 and the second inorganic encapsulation layer 330 may each include at least one inorganic material from among aluminum oxide ($Al_2O_3$), titanium oxide ($TiO_2$), tantalum oxide ($Ta_2O_5$), hafnium oxide (HfO$_2$), zinc oxide (ZnO), silicon nitride (SiN$_x$), and silicon oxynitride (SiON).

Although not shown in FIG. 9, a touch electrode layer may be disposed on the encapsulation layer 300, and an optical functional layer may be disposed on the touch electrode layer. The touch electrode layer may obtain coordinate information according to an external input, for example, a touch event. The optical functional layer may reduce the reflectance of light (external light) incident from the outside toward the display apparatus, and/or improve color purity of light emitted from the display apparatus. As an embodiment, the optical functional layer may include a retarder and/or a polarizer. The retarder may be a film type or a liquid-crystal coating type, and may include a λ/2 retarder and/or a λ/4 retarder. The polarizer may also be a film type or a liquid-crystal coating type. The film-type polarizer may include a stretch-type synthetic resin film, and the liquid-crystal-coating-type polarizer may include liquid crystals in a certain arrangement. The retarder and the polarizer may further include a protective film.

As another embodiment, the optical functional layer may include a black matrix and color filters. The color filters may be arranged by considering a color of light emitted from each of the pixels of the display panel 10. Each of the color filters may include red, green, or blue pigments or dyes. Alternatively, each of the color filters may further include quantum dots in addition to the pigments or dyes stated above. Alternatively, some of the color filters may not include the pigments or dyes stated above and may include scattering particles such as titanium oxide.

As another embodiment, the optical functional layer may include a destructive interference structure. The destructive interference structure may include a first reflective layer and a second reflective layer, which are on different layers. First reflected light and second reflected light respectively reflected by the first reflective layer and the second reflective layer may destructively interfere with each other, and accordingly, the reflectance of external light may be reduced.

An adhesive member may be arranged between the touch electrode layer and the optical functional layer. As the adhesive member, a general adhesive member known in the related art may be employed without limitation. The adhesive member may include a pressure sensitive adhesive (PSA).

The crack inducing pattern CIP may be arranged at the central portion of the connection portion CP. The crack inducing pattern CIP may include the first groove G1 and the first pattern layer PTL1. The first groove G1 may be formed by removing a portion of an insulating layer in the connection portion CP, and the first pattern layer PTL1 may be disposed over the first groove G1.

As an embodiment, the first groove G1 may be formed by removing at least a portion of the second organic insulating layer 116 which is a planarization layer. That is, the second organic insulating layer 116 may include a first hole 116H1 for forming the first groove G1. At least a portion of a film disposed below the second organic insulating layer 116, e.g., a first etch control layer 120, may be exposed through the first hole 116H1.

The first etch control layer 120 may be in the first groove G1. The first etch control layer 120 may be disposed below the second organic insulating layer 116 and on the first organic insulating layer 115. That is, the first etch control layer 120 may be disposed between the second organic insulating layer 116 and the first organic insulating layer 115. For example, the first etch control layer 120 may include the same material as that of the connection metal CM of the first pixel circuit PC1. Hereinafter, when "layer A" and "layer B" include the same material, it may mean that "layer A" and "layer B" are simultaneously formed through the same operation in a manufacturing operation. At least a portion of the first etch control layer 120 may be exposed through a bottom surface of the first groove G1.

The first etch control layer 120 may prevent the first organic insulating layer 115 from being etched together during a process of forming the first groove G1 in the second organic insulating layer 116. Accordingly, the first etch control layer 120 preferably includes a material having a good etch selectivity with the second organic insulating layer 116, that is, the first etch control layer 120 is not easily etched (e.g., dry etching) by etchant of the second organic insulating layer 116. For example, the first etch control layer 120 may include an inorganic insulating material and/or a metal. In the embodiment of FIG. 9, the first etch control layer 120 may include the same material as that of the connection metal CM electrically connecting the pixel electrode 211 to the first pixel circuit PC1.

The first pattern layer PTL1 may be disposed on the first groove G1. End portions of the first pattern layer PTL1, the end portions protruding toward the center of the first groove G1, may form a pair of eaves-shaped protruding tips (hereinafter, referred to as first tips PT1). The first tips PT1 may each be suspended in the air from the bottom surface of the first groove G1. Accordingly, the crack inducing pattern CIP may form an undercut structure at a connection part extending from a lower surface of each of the first tips PT1 to an inner side surface of the first groove G1.

The second groove G2 surrounding the first pixel PX1 (refer to FIG. 4 or 7) may be disposed near an edge of the first display portion DP1. As an embodiment, the second groove G2 may have a closed loop shape that completely surrounds the first pixel PX1 along the perimeter of the first display portion DP1. The second groove G2 may prevent impurities and/or moisture from penetrating into the first display portion DP1 from the outside.

As an embodiment, the second groove G2 may be a portion of the second organic insulating layer 116 in which the second organic insulating layer 116 is removed. That is, the second organic insulating layer 116 may include a second hole 116H2 for forming the second groove G2. At least a portion of a film disposed below the second organic insulating layer 116, e.g., a second etch control layer 122, may be exposed through the second hole 116H2.

The second etch control layer 122 may be disposed below the second groove G2. The second etch control layer 122 may be disposed between the second organic insulating layer 116 and the first organic insulating layer 115. For example, the second etch control layer 122 may include the same material as that of the connection metal CM of first pixel circuit PC1. At least a portion of the second etch control layer 122 may be exposed through a bottom surface of the second groove G2.

The second etch control layer 122 may prevent the first organic insulating layer 115 from being etched during a process of forming the second groove G2 in the second organic insulating layer 116. Accordingly, the second etch control layer 122 preferably includes a material having a good etch selectivity with the second organic insulating layer 116, that is, the second etch control layer is not easily etched (e.g., dry etching) by etchant of the second organic insulating layer 115. For example, the second etch control layer 122 may include an inorganic insulating material and/or a metal.

The second pattern layer PTL2 may be disposed on the second groove G2. End portions of the second pattern layer PTL2, the end portions protruding toward the center of the second groove G2, may form a pair of eaves-shaped protruding tips (hereinafter, referred to as second tips PT2). The second tips PT2 may each be suspended in the air from the bottom surface of the second groove G2. Through this structure, an undercut structure may be formed at a connection part extending from a lower surface of each of the second tips PT2 to an inner side surface of the second groove G2.

As an embodiment, the second pattern layer PTL2 may be the extension of a portion of the passivation layer PVX. Based on the cross-sectional structure of FIG. 9, the second pattern layer PTL2 including the second tip PT2 disposed adjacent to the first display portion DP1 among the pair of second tips PT2 may be the passivation layer PVX extending toward the second groove G2.

Although FIG. 9 shows that the second pattern layer PTL2 disposed on the second groove G2 has a pair of second tips PT2, in another embodiment, as shown in FIG. 10, the second pattern layer PTL2 may be disposed only in a portion adjacent to the first display portion DP1 with respect to the center of the second groove G2 and may not be arranged on an opposite side adjacent to the connection portion CP. In this case, a pair of the second tips PT2 may not be formed on the second groove G2, and the second tip PT2 may be provided only on one side adjacent to the first display portion DP1.

The second tip PT2 of the second pattern layer PTL2 may have a structure for disconnecting the first functional layer 212a and the second functional layer 212c in the second groove G2. In an embodiment, the first functional layer 212a, the second functional layer 212c, and the opposite electrode 213 may be formed on an entire surface of the substrate 100. In this case, the first functional layer 212a and the second functional layer 212c may each include an organic material, and external oxygen or moisture or the like may be introduced in the first organic light-emitting diode OLED1 through at least one of the first functional layer 212a and the second functional layer 212c. To prevent this, the second tip PT2 of the second pattern layer PTL2 may disconnect the first functional layer 212a and the second functional layer 212c, and the separated first functional layer 212a and second functional layer 212c may be arranged in the second groove G2. Accordingly, inflow of moisture or oxygen from the penetrating opening portion POP to the first organic light-emitting diode OLED1 may be prevented and damage to the first organic light-emitting diode OLED1 may be prevented or reduced.

The inorganic insulating layer IIL arranged in the first display portion DP1 may not be arranged in the connection portion CP. That is, the inorganic insulating layer IIL in the connection portion CP may be removed. As the connection portion CP of the display panel 10 may be bent as described with reference to FIGS. 5A and 5B, it is important to secure the flexibility of the connection portion CP. The inorganic insulating layer IIL has less flexibility than the organic insulating layer OIL, and in particular, has a characteristic vulnerable to cracks. The cracks may provide a path through which moisture and oxygen penetrate into the first display portion DP1 or the like. Accordingly, as shown in FIG. 9, as the inorganic insulating layer IIL is removed from the connection portion CP, the flexibility of the connection portion CP may be improved and crack generation may be minimized.

The inorganic insulating layer IIL may have an opening portion IIL-OP corresponding to the connection portion CP. The opening portion IIL-OP may mean an area in which the inorganic insulating layer IIL is removed. An upper surface of the substrate 100 may be exposed through the opening portion IIL-OP. Although an area in which the inorganic insulating layer IIL is removed is defined as the opening portion IIL-OP, in a plan view, the inorganic insulating layer IIL remained may be provided in an island shape corresponding to the first display portion DP1. The opening portion IIL-OP may extend from the connection portion CP to the first display portion DP1. That is, an area of the opening portion IIL-OP may be equal to or greater than an area of the connection portion CP.

In an embodiment, an organic material layer OL may be arranged in the opening portion IIL-OP of the inorganic insulating layer IIL. The organic material layer OL may be disposed in the opening portion IIL-OP of the inorganic insulating layer IIL to fill a step-difference of the inorganic insulating layer IIL formed by the opening portion IIL-OP. A thickness OLt of the organic material layer OL may be approximately equal to a height of the step-difference of the inorganic insulating layer IIL formed by the opening portion IIL-OP. By filling the opening portion IIL-OP of the inorganic insulating layer IIL with the organic material layer OL, the flexibility of the connection portion CP may be improved, and a surface on which a connection line CWL, which will be described below, is disposed may be maximally planarized to improve the reliability of the connection line CWL.

The connection line CWL may be disposed on the organic material layer OL. The connection line CWL may be electrically connected to the first pixel circuit PC1. The first pixel circuit PC1 of the first display portion DP1 may be electrically connected to a pixel circuit of the other display portion (e.g., a second pixel circuit of a second display portion DP2 (refer to FIG. 7)) adjacent to the first display portion DP1 through the connection line CWL. The connection line CWL may include a material having good conductivity. The connection line CWL may include Mo, Al, Cu, Ti, or the like, and may include a multi-layer or a single layer, each including the above material. As an embodiment, the connection line CWL may have a multi-layered structure of Ti/Al/Ti. The connection line CWL may mean a line electrically connecting display portions, and may be, for example, a line through which various signals and power are transmitted such as a data line, a scan line, a power supply line, or the like.

Figure 11:
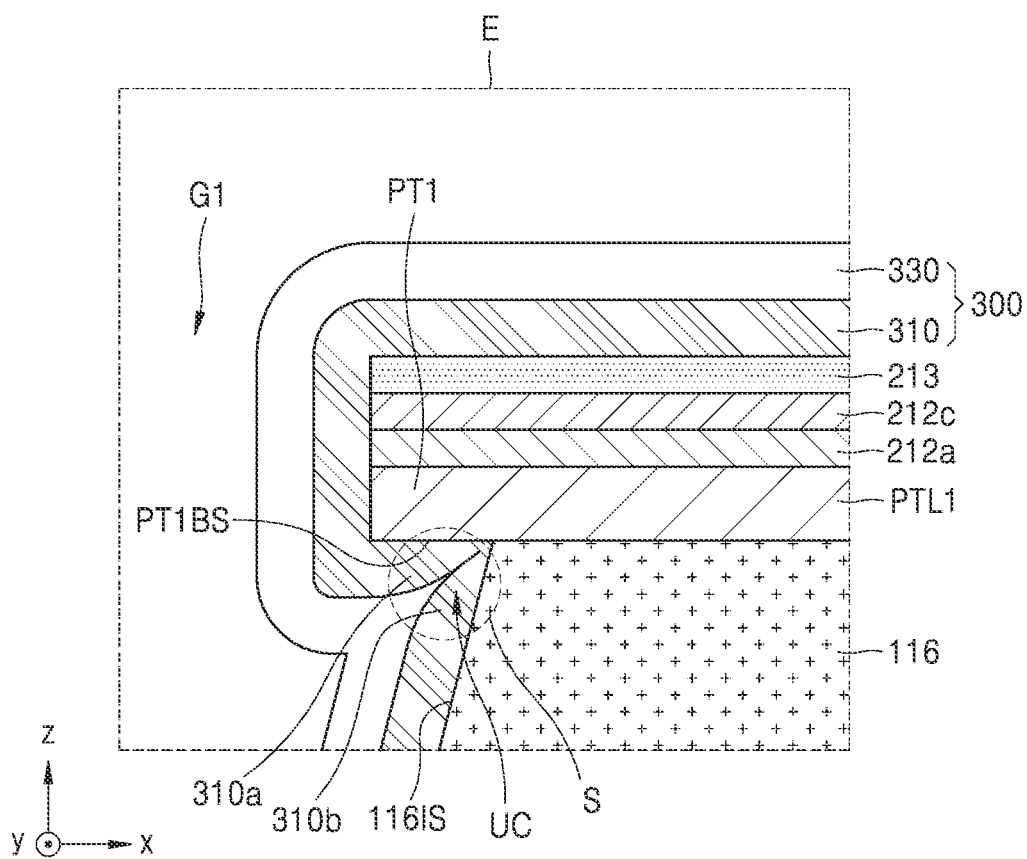
FIG. 11 is a schematic cross-sectional view of an enlarged portion of a display apparatus according to the present embodiment.

FIG. 11 is a schematic cross-sectional view of an enlarged portion of a display apparatus according to the present embodiment. FIG. 11 is an enlarged view of a portion E of FIG. 9.

As described with reference to FIG. 9, the display panel 10 may include the encapsulation layer 300. The encapsulation layer 300 may include the first inorganic encapsulation layer 310 and the second inorganic encapsulation layer 330 which are sequentially stacked. The first inorganic encapsulation layer 310 and the second inorganic encapsulation layer 330 are disposed over the first display portion DP1 and the connection portion CP. The connection portion CP may be deformed along a z-axis, as described with reference to FIGS. 5A and 5B. As the first inorganic encapsulation layer 310 and the second inorganic encapsulation layer 330 arranged in the connection portion CP have high elasticity and low flexibility due to a characteristic of an inorganic film, cracks may occur during the deformation of the connection portion CP. The cracks randomly and atypically occur at unexpected positions and moisture and oxygen penetrating through the cracks may cause problems such as damaging the first organic light-emitting diode OLED1 or causing disconnection of the connection line CWL, or the like.

Accordingly, in a display apparatus according to the present embodiment, a crack inducing pattern CIP having the first groove G1 and an undercut UC portion under the first tip PT1 on the first groove G1 is provided in the connection portion CP, and thus, the flexibility and reliability of the connection portion CP may be improved by guiding cracks of the first inorganic encapsulation layer 310 to a particular position in the crack inducing pattern CIP.

In particular, the first inorganic encapsulation layer 310 may cover the first pattern layer PTL1 and the first groove G1. The first inorganic encapsulation layer 310 may be continuously arranged along a bottom surface PT1BS of the first tip PT1 and an inner side surface 116IS of the first groove G1 extending from the bottom surface PT1BS. That is, the first functional layer 212a, the second functional layer 212c, and the opposite electrode 213 may be disconnected in the undercut UC portion, but the first inorganic encapsulation layer 310 and the second inorganic encapsulation layer 330 may extend to the bottom surface PT1BS without being disconnected in the undercut UC portion.

The first inorganic encapsulation layer 310 may have a seam structure S in the undercut UC portion. The undercut UC portion connected from the bottom surface PT1BS of the first tip PT1 to the inner side surface 1161S of the first groove G1 may have a space deeply drawn inward. A fine crack may be formed in the seam structure S formed in the undercut UC portion of the first inorganic encapsulation layer 310.

The first inorganic encapsulation layer 310 may include a first portion 310a formed on the bottom surface PT1BS of the first tip PT1, and a second portion 310b formed on the inner side surface 116IS of the first groove G1, and the seam structure S may be a point where the first portion 310a and the second portion 310b meet. The first inorganic encapsulation layer 310 may have a portion that has a reduced thickness in the seam structure disposed between the first portion 310a and the second portion 310b, and in this portion, cracks of the first inorganic encapsulation layer 310 may be induced. The seam structure S in the first inorganic encapsulation layer 310 may prevent cracks from randomly occurring in other areas by inducing predetermined cracks in the seam structure S. In addition, the first inorganic encapsulation layer 310 may induce expected cracks in the seam structure S to improve flexibility in the connection portion CP.

Figure 12:
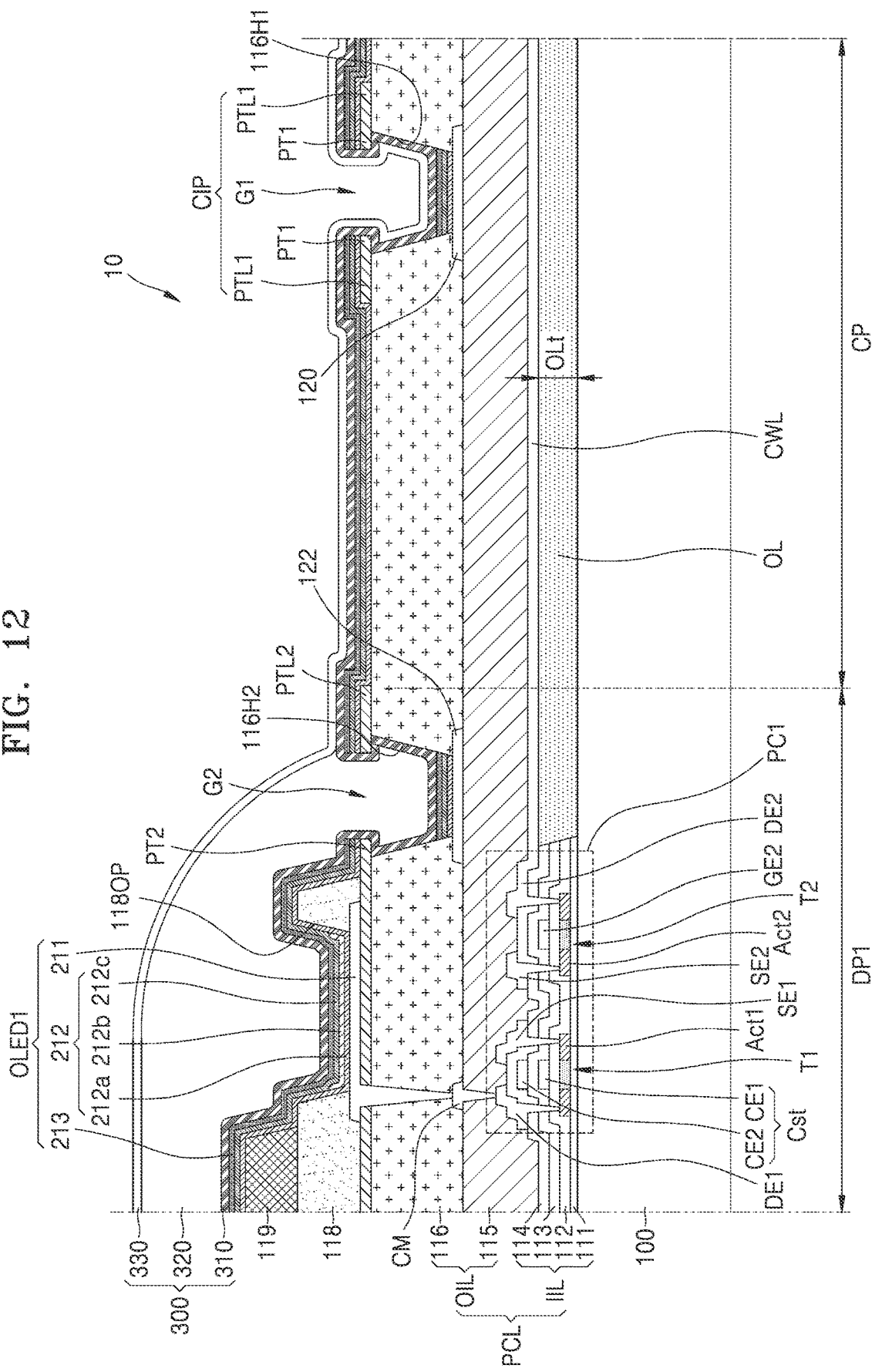
FIG. 12 is a schematic cross-sectional view of a display apparatus according to the present embodiment.

FIG. 12 is a schematic cross-sectional view of a display apparatus according to the present embodiment. FIG. 12 is a modified embodiment of FIG. 9.

FIG. 12 is similar to FIG. 9 but is different in a structure of the encapsulation layer 300. Hereinafter, differences will be mainly described on the structure of the encapsulation layer 300, and descriptions already given with reference to FIG. 9 is omitted.

Referring to FIG. 12, the display panel 10 may include the encapsulation layer 300 provided over the first display portion DP1 and the connection portion CP. The encapsulation layer 300 may include the first inorganic encapsulation layer 310, the second inorganic encapsulation layer 330, and an organic encapsulation layer 320 disposed between the first inorganic encapsulation layer 310 and the second inorganic encapsulation layer 330.

The organic encapsulation layer 320 may include a polymer-based material. The polymer-based material may include an acrylic resin, an epoxy resin, polyimide, polyethylene, or the like. As an embodiment, the organic encapsulation layer 320 may include acrylate.

In an embodiment, the organic encapsulation layer 320 may have a disconnected portion in the connection portion CP disposed between adjacent display portions. That is, the organic encapsulation layer 320 may be arranged to correspond only to the display portion DP. The first inorganic encapsulation layer 310 and the second inorganic encapsulation layer 330 entirely and continuously cover the substrate 100 on the opposite electrode 213, and on the contrary, the organic encapsulation layer 320 may be patterned to correspond only to the display portion DP. For example, as shown in FIG. 4 or 7, in the first display portion DP1, the second display portion DP2, and the connection portion CP connected between the first display portion DP1 and the second display portion DP2, the organic encapsulation layer 320 may be provided only in each of the first display portion DP1 and the second display portion DP2, and may not be provided in the connection portion CP. As the organic encapsulation layer 320 has a greater thickness than a thickness of the first inorganic encapsulation layer 310 and a thickness of the second inorganic encapsulation layer 330, the organic encapsulation layer 320 may be removed from the connection portion CP to improve the flexibility of the connection portion CP.

The organic encapsulation layer 320 may fill the second groove G2. As the organic encapsulation layer 320 fills the second groove G2 not to overflow to an area beyond the second groove G2, an area in which the organic encapsulation layer 320 is disposed may not exceed the second groove G2. Although not illustrated in FIG. 12, a dam which prevents the organic encapsulation layer 320 from overflowing into the connection portion CP may be additionally provided to surround the second groove G2 between the second groove G2 and the connection portion CP.

Figure 15:
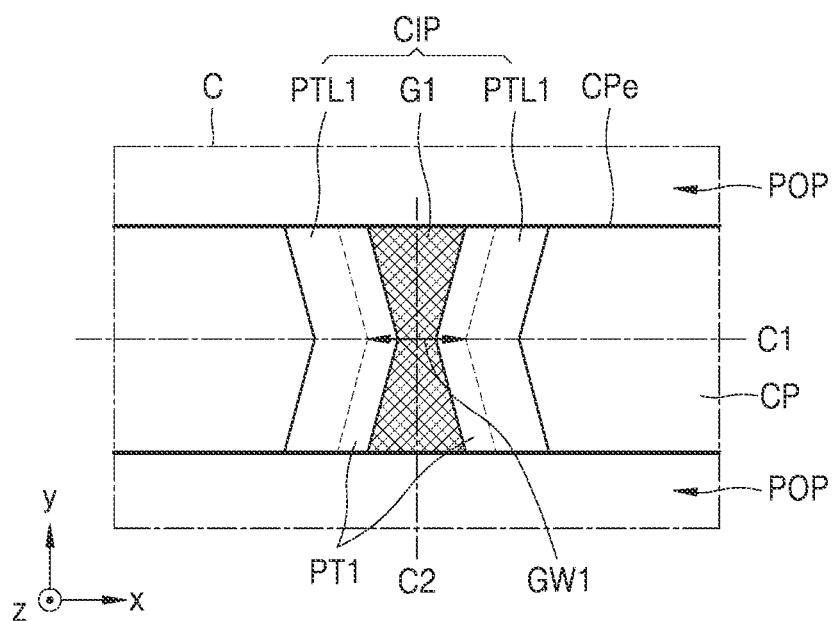
Figure 16:
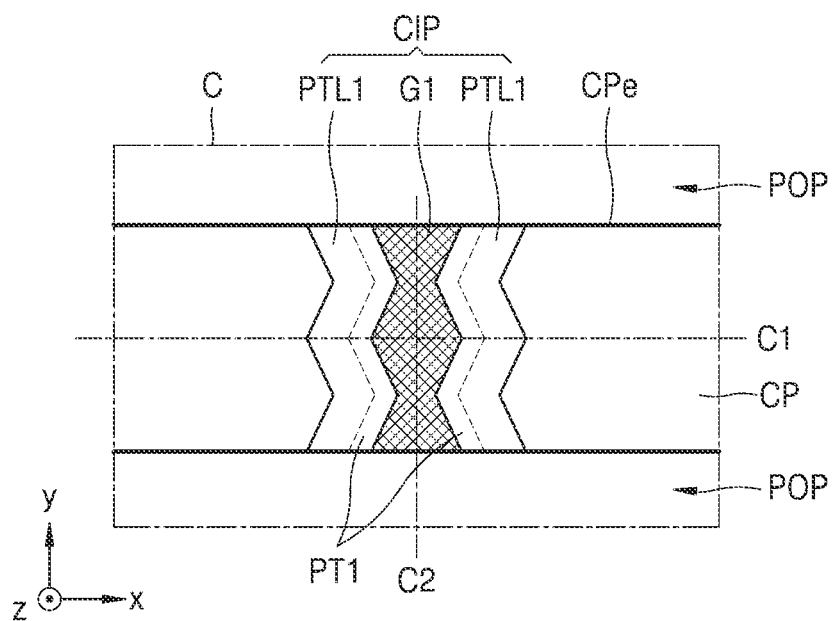
Figure 17:
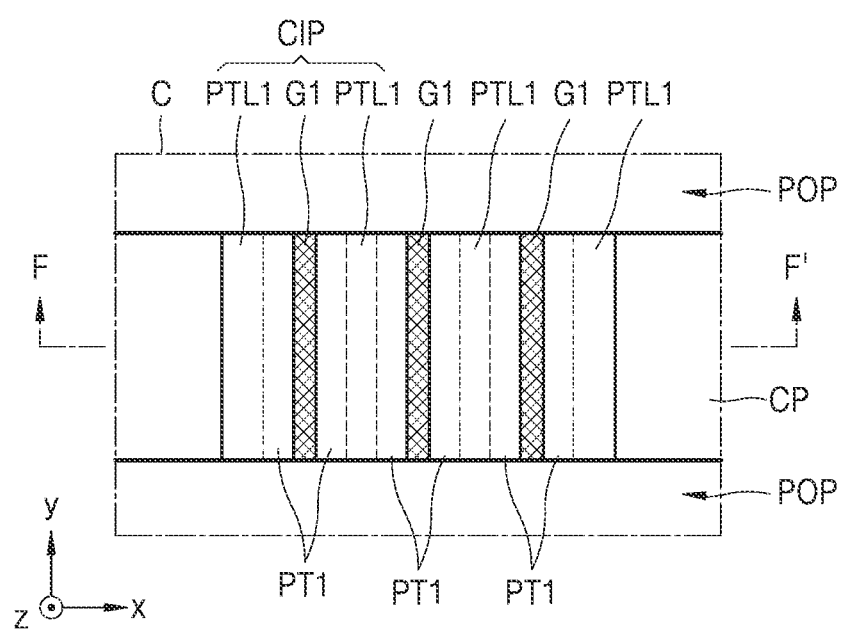
Figure 18:
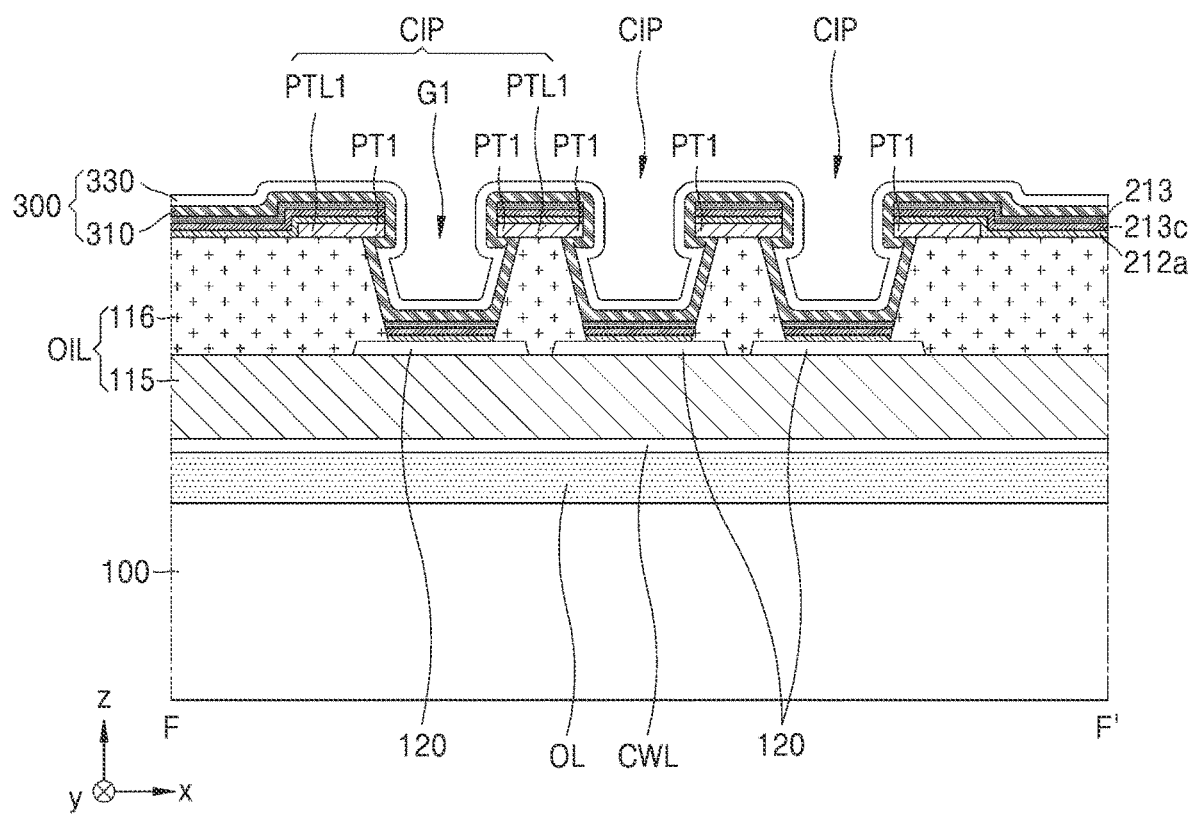
FIG. 18 is a cross-sectional view schematically illustrating a cross-section of FIG. 17.
Figure 19:
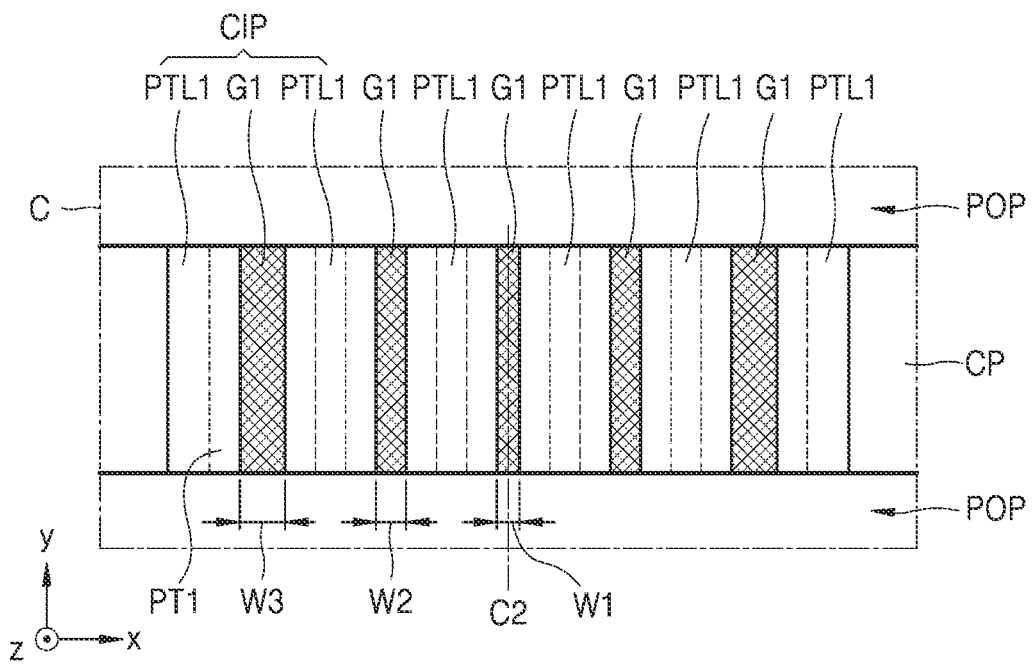
FIGS. 19 and 20 are schematic plan views each illustrating a crack inducing pattern of a display apparatus according to the present embodiment.
Figure 20:
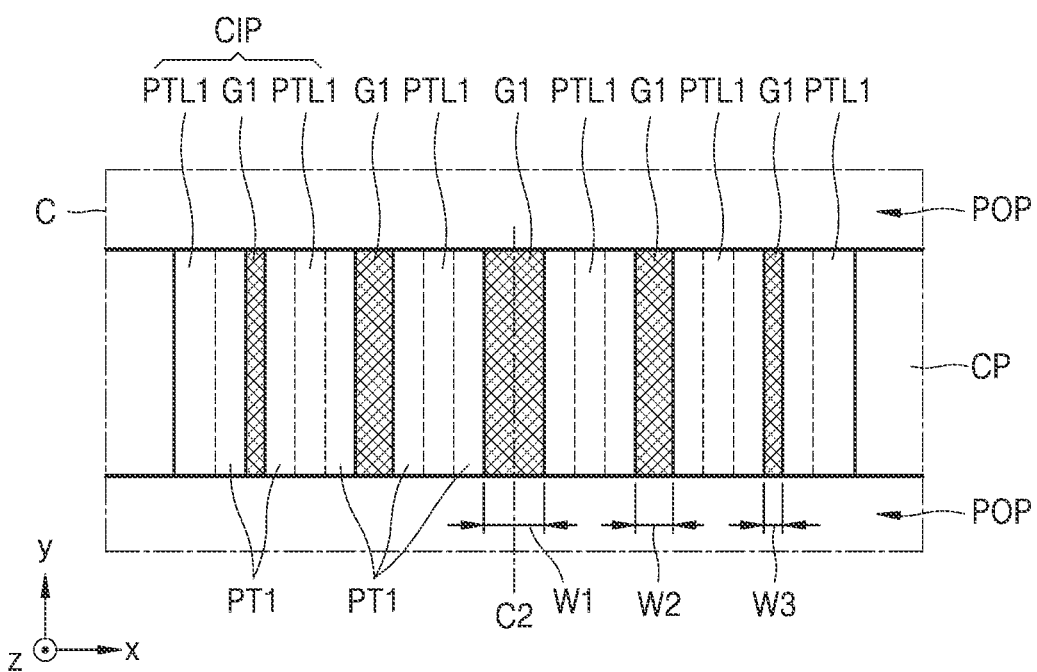

FIGS. 13 to 17 are schematic plan views each illustrating a crack inducing pattern of a display apparatus according to the present embodiment, FIG. 18 is a schematic cross-sectional view of the crack inducing pattern taken along line F-F' of FIG. 17, and FIGS. 19 and 20 are schematic plan views each illustrating a crack inducing pattern of a display apparatus according to the present embodiment.

FIGS. 13 to 17 are modified embodiments of FIG. 8 and show various shapes of the crack inducing pattern CIP in a plan view. Hereinafter, differences from FIG. 8 are mainly described, and descriptions already given with reference to FIG. 8 are omitted.

Figure 13:
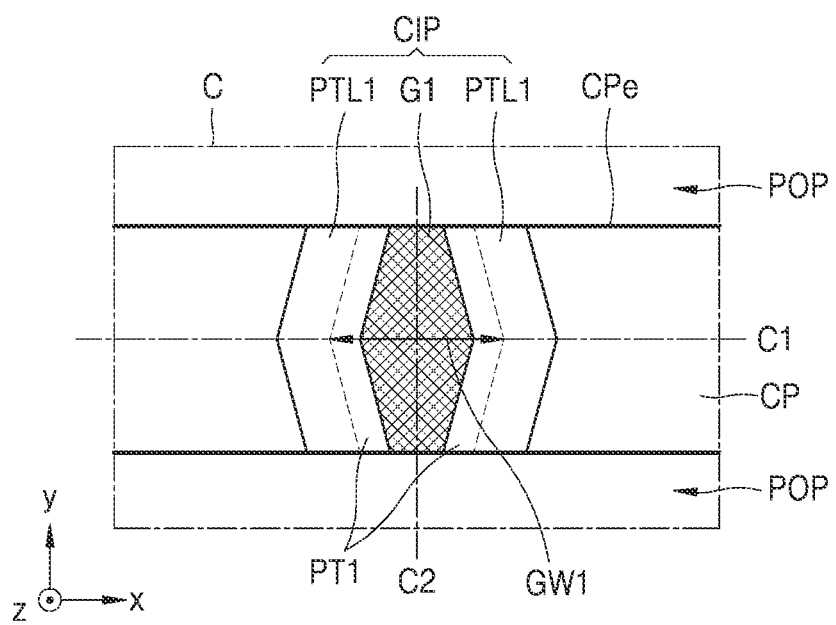
FIGS. 13, 14, 15, 16 and 17 are schematic plan views each illustrating a crack inducing pattern of a display apparatus according to the present embodiment.

Referring to FIG. 13, the crack inducing pattern CIP may include the first groove G1 and the first pattern layer PTL1 disposed on the first groove G1. The first groove G1 may be formed by etching a portion of the second organic insulating layer 116 described with reference to FIG. 9. A pair of first pattern layers PTL1 may be formed and arranged on both sides of the first groove G1 with the first groove G1 disposed therebetween. Each of the pair of first pattern layers PTL1 may include a first tip PT1 protruding toward a center line C2 of the first groove G1. The first tip PT1 is the same as the descriptions already given with reference to FIGS. 8 to 11.

In an embodiment, in a plan view, an edge of the first groove G1 and the first pattern layer PTL1 formed along the edge of the first groove G1 may each have a V-shape (e.g., chevron type). A width GW1 of the first groove G1 may be widest at the center of the first groove G1 along a reference line C1 and decreases toward an edge CPe of the connection portion CP.

The first pattern layer PTL1 extending along the periphery of the first groove G1 may have a V-shape along the edge of the first groove G1. The pair of first pattern layers PTL1 may be symmetrically arranged with respect to the center line C2 of the first groove G1.

Figure 14:
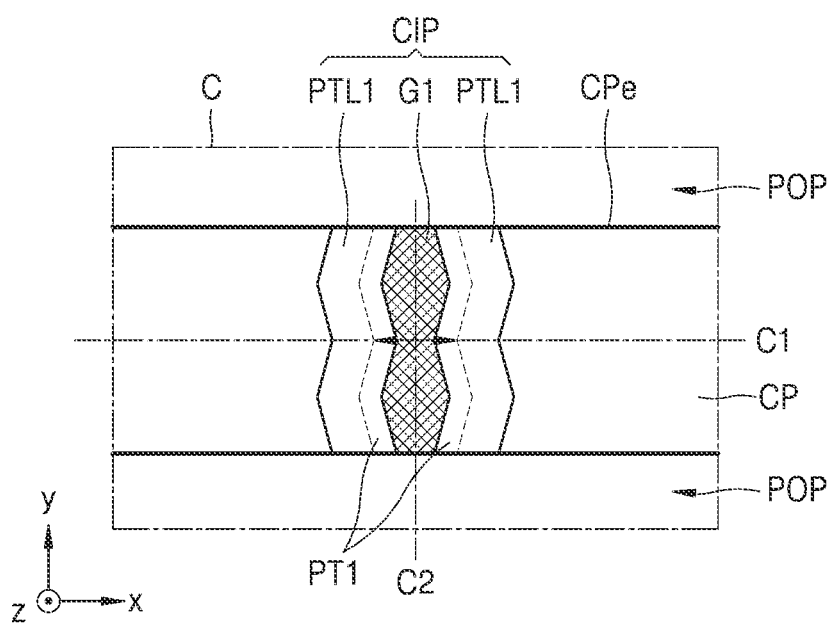

Referring to FIG. 14, in a plan view, the edge of the first groove G1 and the first pattern layer PTL1 formed along the edge of the first groove G1 may each have a W-shape. This may be understood as a structure in which a V-shape as shown in FIG. 13 is symmetrically repeated with respect to the reference line C1.

Referring to FIG. 15, in a plan view, the edge of the first groove G1 and the first pattern layer PTL1 formed along the edge of the first groove G1 may each have a V-shape (e.g., chevron type). The width GW1 of the first groove G1 may be narrowest at the center of the first groove G1 along a reference line C1 and increases toward the edge CPe of the connection portion CP.

Referring to FIG. 16, in a plan view, the edge of the first groove G1 and the first pattern layer PTL1 formed along the edge of the first groove G1 may each have a W-shape. This may be understood as a structure in which a V-shape as shown in FIG. 15 is symmetrically repeated with respect to the reference line C1.

As an embodiment, shapes, as shown in FIGS. 14 and 16, are shapes where the shapes shown in FIGS. 13 and 15, respectively, are repeated twice, but in another embodiment, a structure in which the shapes of FIGS. 13 and 15 are repeated three or more times is also possible.

Referring to FIGS. 17 and 18, a plurality of crack inducing patterns CIP may also be provided. The plurality of crack inducing patterns CIP may be disposed in one connection portion CP. FIG. 17 shows three crack inducing patterns CIP which is continuously disposed along the first direction. The plurality of crack inducing patterns CIP may be continuously disposed along the first direction. Each of the three crack inducing patterns CIP includes the first groove G1 and the first pattern layers PTL1 disposed on the first groove G1. One first pattern layers PTL1 may be disposed between adjacent first grooves G1, as shown in FIG. 17.

As another embodiment, the first pattern layers PTL1 may be disposed to be spaced apart from each other between adjacent first grooves G1 according to an interval between the adjacent first grooves G1. In this case, the first pattern layer PTL1 may include one first tip PT1 at one end that faces the first groove G1.

FIGS. 19 and 20 illustrate that a plurality of crack inducing patterns CIP are provided similarly to FIG. 17, but intervals between the first grooves G1 of the crack inducing patterns CIP are different from one another. When there are a plurality of crack inducing patterns CIP, as shown in FIG. 17, widths of the crack inducing patterns CIP may be equal to one another, and may also be different from one another as shown in FIGS. 19 and 20. The width of the crack inducing pattern CIP may mean the width of the first groove G1 or a width between a pair of first pattern layers PTL1 spaced apart from each other on the first groove G1 (that is, an interval between a pair of first tips PT1). Because the lengths of the first tips PT1 of the first pattern layer PTL1 are the same, an interval between the pair of first pattern layers PTL1 may be proportional to the width of the first groove G1. In FIGS. 19 and 20, widths between the first grooves G1 were compared.

As shown in FIG. 19, a width W1 of the first groove G1 positioned at the center with respect to a center line C2 may be the narrowest, and widths W2 and W3 of the first grooves G1 may gradually increase toward both sides. In this case, the widths W1, W2, and W3 of the plurality of first grooves G1 may be symmetric to one another with respect to the center line C2. The widths W1, W2, and W3 of the plurality of first grooves G1 may be formed as in Equation 1 below.

$$W1 < W2 < W3 \quad \text{[Equation 1]}$$

Alternatively, as shown in FIG. 20, the width W1 of the first groove G1 positioned at the center with respect to a center line C2 may be the greatest, and the widths W2 and W3 of the first grooves G1 may gradually decrease toward both sides. In this case, the widths W1, W2, and W3 of the plurality of first grooves G1 may be symmetric to one another with respect to the center line C2. The widths W1, W2, and W3 of the plurality of first grooves G1 may be formed as in Equation 2 below.

$$W1 > W2 > W3 \quad \text{[Equation 2]}$$

As described with reference to FIGS. 13 to 20, the crack inducing pattern CIP according to an embodiment of the present disclosure may have various structures. In this way, the effect of the crack inducing pattern CIP may be maximized by applying the crack inducing pattern CIP having an optimal shape according to the arrangement and configuration of the connection portion CP.

A display apparatus is mainly described, but the disclosure is not limited thereto. For example, a method of manufacturing the display apparatus is also included in the scope of the disclosure.

According to an embodiment of the present disclosure as described above, a display apparatus having improved flexibility may be implemented. The scope of the present disclosure is limited by these effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising a display panel in which penetrating opening portion is defined, wherein the display panel comprises: a first display portion in which a first pixel is arranged; a second display portion in which a second pixel is arranged; a connection portion extending in a first direction to connect the first display portion to the second display portion and comprising, at a central portion thereof, a crack inducing pattern extending in a second direction intersecting the first direction; and an encapsulation layer disposed on the first display portion, the second display portion, and the connection portion, wherein the crack inducing pattern comprises a first groove at a central portion of the crack inducing pattern and a first pattern layer disposed on the first groove and comprising a first tip protruding toward a center of the first groove; wherein the first pixel comprises a first light-emitting element and a first pixel circuit portion electrically connected to the first light-emitting element, the second pixel comprises a second light-emitting element and a second pixel circuit portion electrically connected to the second light-emitting element, wherein each of the first pixel circuit portion and the second pixel circuit portion comprises a plurality of conductive layers and at least one inorganic insulating layer disposed between the plurality of conductive layers, and wherein the at least one inorganic insulating layer is patterned to an island shape to correspond to each of the first display portion and the second display portion.

2. The display apparatus of claim 1, wherein the encapsulation layer covers the first tip and an inner side surface of the first groove, and has a seam structure in an undercut portion extending from a bottom surface of the first tip to the first groove.

3. The display apparatus of claim 2, wherein the seam structure of the encapsulation layer comprises a portion that has a reduced thickness.

4. The display apparatus of claim 1, wherein the connection portion further comprises a first etch control layer disposed under the first groove.

5. The display apparatus of claim 4, wherein the first etch control layer is exposed through a bottom of the first groove.

6. The display apparatus of claim 4, wherein the first etch control layer comprises an inorganic material or a metal.

7. The display apparatus of claim 4, wherein each of the first pixel circuit portion and the second pixel circuit portion comprises a thin-film transistor comprising a semiconductor layer, a gate electrode overlapping the semiconductor layer, and an electrode layer connected to the semiconductor layer, and a connection metal connected to the electrode layer on the electrode layer, and wherein the connection metal comprises a same material as that of the first etch control layer.

8. The display apparatus of claim 1, wherein the first tip comprises an inorganic material.

9. The display apparatus of claim 1, further comprising a second groove surrounding the first pixel and the second pixel and disposed at a perimeter of each of the first display portion and the second display portion.

10. The display apparatus of claim 9, wherein the second groove has a closed loop shape.

11. The display apparatus of claim 9, further comprising a second tip disposed on the second groove and protruding toward a center of the second groove.

12. The display apparatus of claim 11, wherein the second tip is arranged adjacent to each of the first display portion and the second display portion.

13. The display apparatus of claim 9, further comprising a second etch control layer disposed under the second groove and at least partially exposed through the second groove.

14. The display apparatus of claim 9, wherein the encapsulation layer comprises:
a first inorganic encapsulation layer;
a second inorganic encapsulation layer disposed on the first inorganic encapsulation layer; and
an organic encapsulation layer disposed between the first inorganic encapsulation layer and the second inorganic encapsulation layer, and
wherein the organic encapsulation layer is disposed in the second groove.

15. The display apparatus of claim 14, wherein the organic encapsulation layer is patterned to correspond to each of the first display portion and the second display portion to independently encapsulate each of the first display portion and the second display portion.

16. The display apparatus of claim 1, wherein the at least one inorganic insulating layer is removed to correspond to the connection portion.

17. The display apparatus of claim 16, wherein the connection portion further comprises an organic material layer in an area in which the at least one inorganic insulating layer is removed.

18. The display apparatus of claim 17, wherein the connection portion further comprises a line extending to connect the first pixel circuit portion to the second pixel circuit portion, and the line is disposed on the organic material layer.

19. The display apparatus of claim 18, wherein each of the first pixel circuit portion and the second pixel circuit portion comprises a thin-film transistor comprising a semiconductor layer, a gate electrode overlapping the semiconductor layer, and an electrode layer connected to the semiconductor layer, and
wherein the line comprises a same material as that of the electrode layer.

20. The display apparatus of claim 1, wherein the display panel further comprises a planarization layer configured to cover the first pixel circuit portion and the second pixel circuit portion, and a passivation layer disposed on the planarization layer, wherein each of the first light-emitting element and the second light-emitting element comprises a pixel electrode, an opposite electrode disposed on the pixel electrode, and an intermediate layer disposed between the pixel electrode and the opposite electrode, and wherein the passivation layer is disposed between the planarization layer and the pixel electrode.

21. The display apparatus of claim 20, wherein the first tip is arranged on the same layer as that of the passivation layer.

22. The display apparatus of claim 20, wherein the first groove is provided by etching a portion of the planarization layer.

23. The display apparatus of claim 20, wherein the passivation layer is removed to correspond to the connection portion.

24. The display apparatus of claim 1, wherein the encapsulation layer comprises a first inorganic encapsulation layer and a second inorganic encapsulation layer directly disposed on the first inorganic encapsulation layer.

25. The display apparatus of claim 1, wherein the crack inducing pattern comprises plurality of first grooves, and
wherein widths of the plurality of first grooves adjacent to each other is different from each other.

26. A display apparatus comprising: a substrate comprising a first display area, a second display area, and a connection area connecting the first display area to the second display area and having a cut portion adjacent to the first display area, the second display area, and the connection area; a first display portion arranged in the first display area and comprising a first pixel; a second display portion arranged in the second display area and comprising a second pixel; a crack inducing pattern comprising a groove and a protruding tip on the groove in the connection area; and an encapsulation layer disposed over the first display area, the second display area, and the connection area to cover the crack inducing pattern; wherein the first pixel comprises a first light-emitting element and a first pixel circuit portion electrically connected to the first light-emitting element, the second pixel comprises a second light-emitting element and a second pixel circuit portion electrically connected to the second light-emitting element, wherein each of the first pixel circuit portion and the second pixel circuit portion comprises a plurality of conductive layers and at least one inorganic insulating layer disposed between the plurality of conductive layers, and wherein the at least one inorganic insulating layer is patterned to an island shape to correspond to each of the first display portion and the second display portion.

27. The display apparatus of claim 26, wherein the connection area extends in a first direction, and the crack inducing pattern extends in a second direction intersecting the first direction.

28. The display apparatus of claim 26, wherein the cut portion is formed through the substrate.

* * * * *